United States Patent  (10) Patent No.: US 12,086,490 B2
Okada  (45) Date of Patent: Sep. 10, 2024

(54) IMAGE FORMING APPARATUS GENERATES FOLDER TO STORE DATA, APPROPRIATELY CONTROLLING DISPLAY A FOLDER THAT SATISFY A DISPLAY CONDITION, AND FOLDER DISPLAY CONTROL METHOD

(71) Applicant: SHARP KABUSHIKI KAISHA, Osaka (JP)

(72) Inventor: Mikiya Okada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/371,421

(22) Filed: Sep. 21, 2023

(65) Prior Publication Data

US 2024/0126493 A1  Apr. 18, 2024

(30) Foreign Application Priority Data

Oct. 17, 2022 (JP) ................. 2022-166346

(51) Int. Cl.
  *G06F 3/12* (2006.01)
  *H04N 1/00* (2006.01)

(52) U.S. Cl.
  CPC ........... *G06F 3/127* (2013.01); *G06F 3/1205* (2013.01); *G06F 3/1222* (2013.01); *G06F 3/1238* (2013.01); *H04N 1/00424* (2013.01); *H04N 1/00946* (2013.01); *H04N 2201/0094* (2013.01)

(58) Field of Classification Search
  None
  See application file for complete search history.

(56) References Cited

U.S. PATENT DOCUMENTS

| 7,815,380 | B2 * | 10/2010 | Choo | G06F 16/40 |
| | | | | 358/1.15 |
| 2006/0221377 | A1 * | 10/2006 | Nishio | H04N 1/444 |
| | | | | 358/1.14 |
| 2007/0206225 | A1 * | 9/2007 | Shinohara | G06F 3/1204 |
| | | | | 358/1.15 |
| 2012/0066294 | A1 * | 3/2012 | Mizuno | H04N 1/00435 |
| | | | | 709/203 |
| 2019/0387127 | A1 * | 12/2019 | Kubota | H04N 1/00421 |

FOREIGN PATENT DOCUMENTS

JP  2015-093394 A  5/2015

* cited by examiner

*Primary Examiner* — Haris Sabah
(74) *Attorney, Agent, or Firm* — ScienBiziP, P.C.

(57) ABSTRACT

An image forming apparatus includes a controller, a storage that stores data, and an image former that forms an image, based on the data. The controller stores data received from an external apparatus, in an individual folder to which a name based on information on the external apparatus is assigned, enables settings for the individual folder, and displays, on a screen that displays the individual folder, the individual folder that is set to satisfy a display condition, regardless of whether or not data is stored in the individual folder.

11 Claims, 36 Drawing Sheets

FIG. 3A

| INDIVIDUAL FOLDER NAME | PRESENCE OR ABSENCE OF FIXED DISPLAY |
|---|---|
| S117332_PC-10016L | PRESENCE |
| S123425_PC-10023M | – |
| S134535_PC-10031K | – |
| ⋮ | ⋮ |

FIG. 3B

| USER NAME | LOGIN NAME | PASSWORD | BELONGING GROUP |
|---|---|---|---|
| S117332 | S117332 | ABC123 | Group1 |
| S123425 | S123425 | DEF456 | Group1, Group2 |
| S134535 | S134535 | HIJ789 | – |
| ⋮ | ⋮ | ⋮ | ⋮ |

FIG. 3C

| GROUP NAME |
|---|
| Group1 |
| Group2 |
| ⋮ |

FIG. 3D

| SETTING ITEM NAME | SETTING VALUE |
|---|---|
| USER AUTHENTICATION | ENABLE |
| INDIVIDUAL FOLDER NAMING METHOD | USER NAME + COMPUTER NAME — D100 |
| ⋮ | ⋮ |

FIG. 13

| INDIVIDUAL FOLDER NAME | USER NAME | COMPUTER NAME | PRESENCE OR ABSENCE OF FIXED DISPLAY |
|---|---|---|---|
| UX GROUP SHARING | S117332 | PC-10016L | PRESENCE |
| S123425 PC-10023M | S123425 | PC-10023M | - |
| S134535 PC-10031K | S134535 | PC-10031K | - |
| ⋮ | ⋮ | ⋮ | ⋮ |

FIG. 16

| INDIVIDUAL FOLDER NAME | PRESENCE OR ABSENCE OF FIXED DISPLAY | PASSWORD |
|---|---|---|
| S117332 PC-10016L | PRESENCE | -- |
| S123425 PC-10023M | -- | abc123 |
| S134535 PC-10031K | -- | -- |
| ⋮ | ⋮ | ⋮ |

FIG. 24

| INDIVIDUAL FOLDER NAME | PRINT DATA NAME | LAST PRINT DATE AND TIME |
|---|---|---|
| S117332_PC-10016L | TEST PAGE | 2022/03/19 11:20:49 |
| S117332_PC-10016L | QUOTATION | - |
| S117332_PC-10016L | CONTRACT | - |
| ⋮ | ⋮ | ⋮ |

FIG. 29A

| INDIVIDUAL FOLDER NAME | PRESENCE OR ABSENCE OF FIXED DISPLAY | DISCLOSURE DESTINATION 1 | DISCLOSURE DESTINATION 2 | DISCLOSURE DESTINATION 3 |
|---|---|---|---|---|
| S117332_PC-10016L | PRESENCE | Group1 | - | - |
| S123425_PC-10023M | PRESENCE | Group1 | Group2 | - |
| S134535_PC-10031K | - | - | - | - |
| ⋮ | ⋮ | ⋮ | ⋮ | ⋮ |

FIG. 29B

| USER NAME | PASSWORD | BELONGING GROUP | DISPLAY NAME | DISPLAY PATTERN |
|---|---|---|---|---|
| S117332 | ABC123 | Group1 | User1 | S117332* |
| S123425 | DEF456 | Group1, Group2 | User2 | S123425* |
| S134535 | HIJ789 | - | User3 | S134* |
| ⋮ | ⋮ | ⋮ | ⋮ | ⋮ |

FIG. 32A

USER REGISTRATION

REGISTER(U)  ADDITIONAL REGISTRATION(Y)  CANCEL(C)                TO MENU LIST

USER NAME (MANDATORY): S117332  (WITHIN 255 FULL-SIZE OR HALF-SIZE CHARACTERS)

☐ APPLY USER NAME TO LOGIN NAME

KANA/SEARCH CHARACTER (MANDATORY): E  (WITHIN 10 FULL-SIZE HIRAGANA CHARACTERS)

INDEX (MANDATORY): USER 1

LOGIN NAME: S117332  (WITHIN 255 FULL-SIZE OR HALF-SIZE CHARACTERS)

PASSWORD: ●●●●●●●●  (1 TO 255 DIGITS)

PASSWORD (CONFIRMATION): ●●●●●●●●  (1 TO 255 DIGITS)

DISPLAY PATTERN OF INDIVIDUAL FOLDER: S117332*  (WITHIN 255 FULL-SIZE OR HALF-SIZE CHARACTERS)

BELONGING GROUP:
1: Group1
2: NOT SET
3: NOT SET

INDIVIDUAL FOLDER   LOGOUT S117332         JOB STATUS   — W810

INDIVIDUAL FOLDER REGISTRATION — W820

[REGISTER(U)] [ADDITIONAL REGISTRATION(Y)] [CANCEL(C)]   TO MENU LIST

INDIVIDUAL FOLDER NAME:  [S123425_PC-10023M]  (WITHIN 255 FULL-SIZE OR HALF-SIZE CHARACTERS)

○ DISCLOSE TO EVERYONE   (WITHIN 255 FULL-SIZE OR HALF-SIZE CHARACTERS)
● SPECIFY DISCLOSURE DESTINATION

- No. 1: Group1
- No. 2: NOT SET
- No. 3: NOT SET

USER REGISTRATION — W830

[REGISTER(U)] [ADDITIONAL REGISTRATION(Y)] [CANCEL(C)]   TO MENU LIST

USER NAME (MANDATORY): [S117332]  (WITHIN 255 FULL-SIZE OR HALF-SIZE CHARACTERS)

APPLY USER NAME TO LOGIN NAME

KANA/SEARCH CHARACTER (MANDATORY): [E]  (WITHIN 10 FULL-SIZE HIRAGANA CHARACTERS)

INDEX (MANDATORY): [USER 1]

LOGIN NAME: [S117332]  (WITHIN 255 FULL-SIZE OR HALF-SIZE CHARACTERS)

PASSWORD: [●●●●●●●●]  (1 TO 255 DIGITS)

PASSWORD (CONFIRMATION): [●●●●●●●●]  (1 TO 255 DIGITS)

DISPLAY PATTERN OF INDIVIDUAL FOLDER: [S117332*]  (WITHIN 255 FULL-SIZE OR HALF-SIZE CHARACTERS)

BELONGING GROUP:
1: Group1
2: NOT SET
3: NOT SET

— E830

IMAGE FORMING APPARATUS GENERATES FOLDER TO STORE DATA, APPROPRIATELY CONTROLLING DISPLAY A FOLDER THAT SATISFY A DISPLAY CONDITION, AND FOLDER DISPLAY CONTROL METHOD

BACKGROUND OF THE INVENTION

Field of the Invention

The present disclosure relates to an image forming apparatus, and the like.

Description of the Background Art

Some multifunction peripherals (image forming apparatuses) receive data from another apparatus, and store the data in a predetermined storage area. In addition, there has been disclosed a technique for displaying only an icon of a user who stores print data, when displaying an icon list screen on which icons of the user who has input print data generated in a client personal computer (PC) to a multifunction peripheral are displayed.

An object of the present disclosure is, for example, to provide a technique for appropriately controlling display of a folder generated for storing data received from an external apparatus.

SUMMARY OF THE INVENTION

In order to solve the above problem, an image forming apparatus according to the present disclosure includes a controller; a storage that stores data; and an image former that forms an image based on the data. The controller stores data received from an external apparatus, in an individual folder to which a name based on information on the external apparatus is assigned, enables settings for the individual folder, and displays, on a screen that displays the individual folder, the individual folder that is set to satisfy a display condition, regardless of whether or not data is stored in the individual folder.

A folder display control method according to the present disclosure is a folder display control method including: storing data received from an external apparatus, in an individual folder to which a name based on information on the external apparatus is assigned; enabling settings for the individual folder; and displaying, on a screen that displays the individual folder, the individual folder that is set to satisfy a display condition, regardless of whether or not data is stored in the individual folder.

The present disclosure enables to provide a technique for appropriately controlling display of a folder generated for storing data received from an external apparatus.

BRIEF DESCRIPTION OF THE DRAWINGS

FIGS. 3A to 3D are diagrams illustrating an example of a data configuration of individual folder information, user information, group information, and a setting table according to the first embodiment.

FIG. 13 is a diagram illustrating an example of a data configuration of individual folder information according to a second embodiment.

FIG. 16 is a diagram illustrating an example of a data configuration of individual folder information according to a third embodiment.

FIG. 24 is a diagram illustrating an example of a data configuration of print information according to the sixth embodiment.

FIGS. 29A and 29B are diagrams illustrating an example of a data configuration of individual folder information, and user information according to an eighth embodiment.

FIGS. 32A and 32B are diagrams illustrating an operation example according to the eighth embodiment.

FIGS. 33A and 33B are diagrams illustrating an operation example according to the eighth embodiment.

DESCRIPTION OF THE PREFERRED EMBODIMENTS

Hereinafter, embodiments for implementing the present disclosure are described with reference to the drawings. Note that, the following embodiments are exemplifications for describing the present disclosure, and the technical scope of the description described in the claims is not limited to the following description.

In general, a multifunction peripheral is an image forming apparatus having a copy function, a scan function, a print function, a fax function, and the like, and is also referred to as a multifunction printer/peripheral (MFP). Some multifunction peripherals have a function of temporarily storing, in a storage area of the multifunction peripheral, data for which printing has been instructed by an information processing apparatus such as a personal computer (PC) in order to prevent misprinting or taking a printed material by mistake. The storage area that temporarily stores data for which printing has been instructed may be referred to as an individual folder or a private mailbox. In the present embodiment, a storage area that stores data for which printing has been instructed is described as an individual folder. Further, a function of temporarily storing data for which printing has been instructed, and printing an image based on the data is also referred to as private mailbox printing.

After printing is performed based on data stored in an individual folder, the data may be deleted. Further, in a case where all pieces of data is deleted from an individual folder, the individual folder may be hidden. However, by hiding an individual folder, a display position of the individual folder, and presence or absence of display are not fixed, which may cause a problem that it takes time and effort for the user to search for a desired individual folder.

In order to solve a problem as described above, in a multifunction peripheral according to the following embodiments, settings for an individual folder are enabled, and in a case where settings are made in such a way as to satisfy a display condition, the individual folder is displayed regardless of whether or not data is stored. Note that, a display condition is a condition for displaying an individual folder regardless of whether or not data is stored.

1. First Embodiment

A first embodiment is an embodiment in which a display condition is that setting is performed to fixedly display an individual folder. Fixed display means displaying an individual folder, even in a case where print data is not stored in the individual folder.

1.1 Overall Configuration

Figure 1:
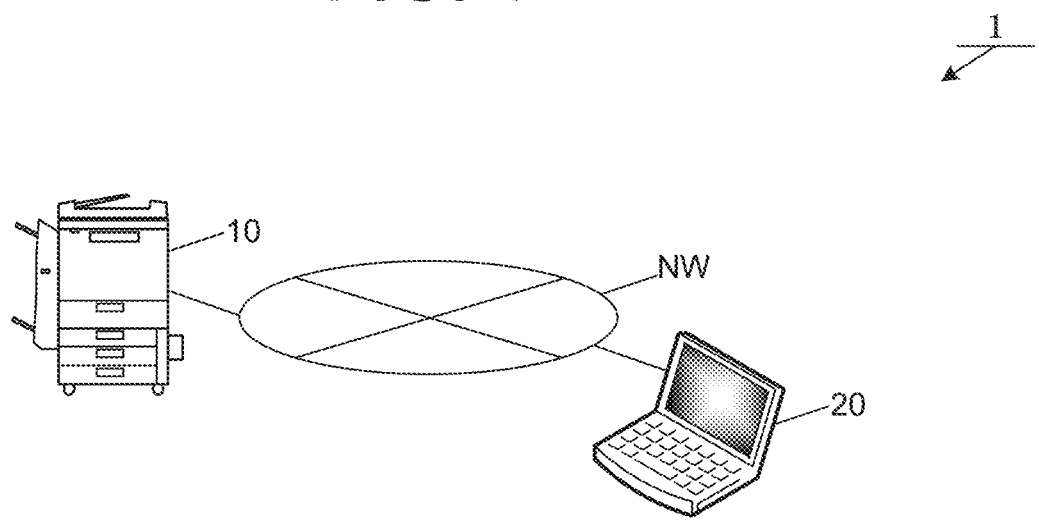
FIG. 1 is a diagram illustrating an overall configuration of a system according to a first embodiment.

FIG. 1 is a diagram illustrating an overview of a system 1 according to the present embodiment. The system 1 is configured in such a way that a multifunction peripheral 10 and an information processing apparatus 20 are connected via a network NW. The network NW is, for example, a local area network (LAN), but any network such as a wide area network (WAN) may be used, as long as each device is communicable.

The multifunction peripheral 10 is an image forming apparatus having a copy function, a scan function, a print function, a facsimile function, and the like, and is also referred to as an MFP. Further, the information processing apparatus 20 is an apparatus capable of transmitting data to the multifunction peripheral 10 by communicating with the multifunction peripheral 10, and is a type of apparatus (external apparatus) different from the multifunction peripheral 10. The information processing apparatus 20 is an apparatus (terminal apparatus) used by a user. The information processing apparatus 20 is configured of, for example, a personal computer (PC). Note that, the information processing apparatus 20 may be configured of a mobile terminal such as a smartphone or a tablet terminal.

1.2 Functional Configuration

1.2.1 Multifunction Peripheral

Figure 2:
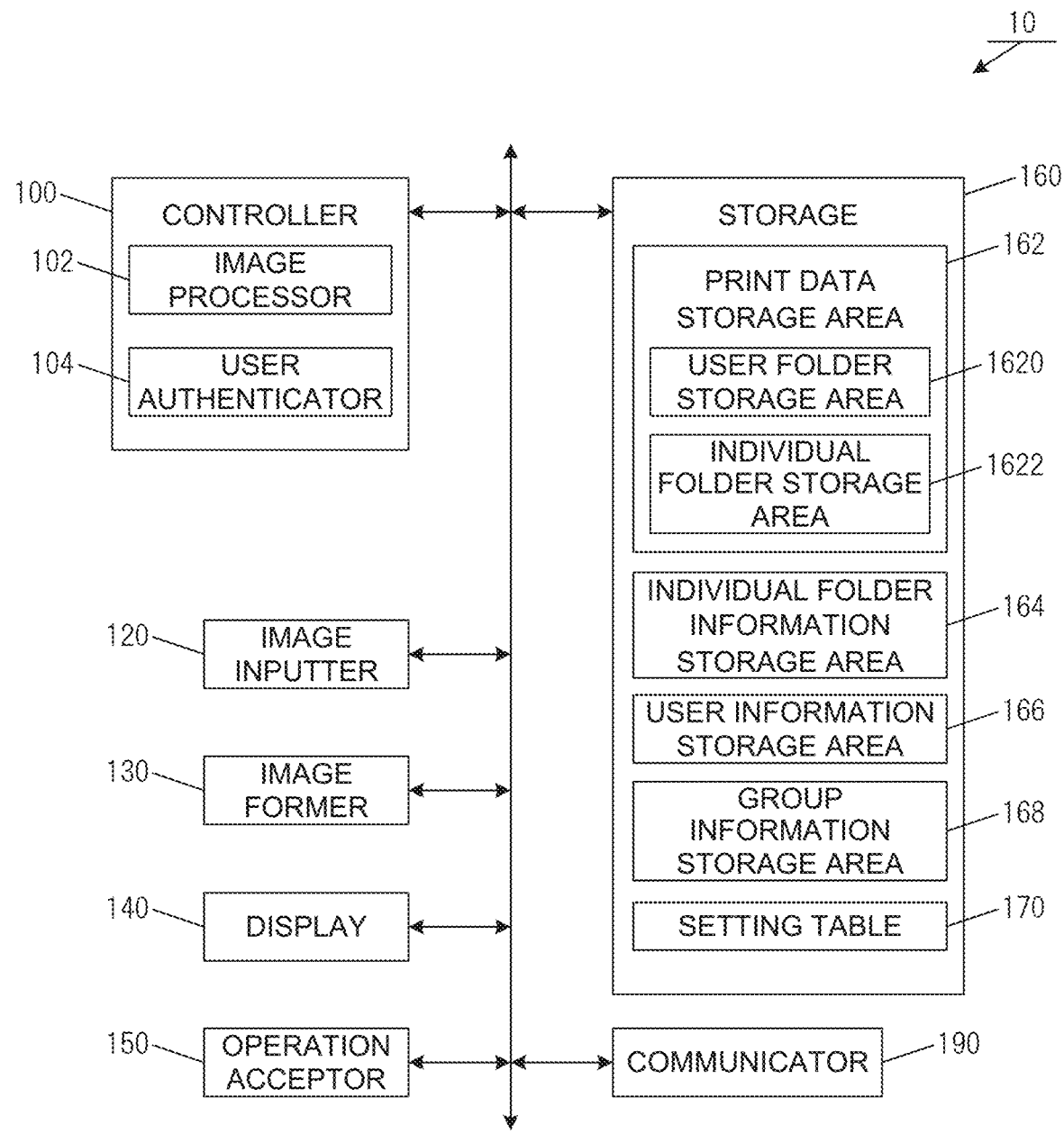
FIG. 2 is a diagram illustrating a functional configuration of a multifunction peripheral according to the first embodiment.

A functional configuration of the multifunction peripheral 10 is described with reference to FIG. 2. As illustrated in FIG. 2, the multifunction peripheral 10 is configured of a controller 100, an image inputter 120, an image former 130, a display 140, an operation acceptor 150, a storage 160, and a communicator 190.

The controller 100 is a functional unit for controlling the entirety of the multifunction peripheral 10. The controller 100 achieves various functions by reading and executing various programs stored in the storage 160, and, for example, is configured of one or more arithmetic devices (central processing units (CPUs)), and the like. The controller 100 may also be configured of a system on a chip (SoC) having a plurality of functions among the functions described below.

The controller 100 functions as an image processor 102 and a user authenticator 104 by executing a program stored in the storage 160.

The image processor 102 executes various pieces of processing related to an image. For example, the image processor 102 performs sharpening processing or gradation conversion processing with respect to an image input via the image inputter 120 and the communicator.

The user authenticator 104 performs authentication of a user who uses the multifunction peripheral 10. For example, in a case where a login name and a password input by the user match a login name and a password included in user information stored in a user information storage area 166 of the storage 160, the user authenticator 104 authenticates the user (knowledge authentication). Note that, the user authenticator 104 may perform property authentication using a token, a card, or the like, or biometric authentication such as fingerprint authentication or face authentication, instead of the above-described knowledge authentication. Further, the user authenticator 104 may cooperate with an apparatus or a service that performs user authentication, and authenticate the user in accordance with a result of user authentication by the apparatus or the service.

The display 140 displays various pieces of information. The display 140 is configured of, for example, a display device such as a liquid crystal display (LCD), an organic electro-luminescence (EL) display, or a micro light emitting diode (LED) display.

The operation acceptor 150 receives an operation instruction by the user using the multifunction peripheral 10. The operation acceptor 150 is configured of an input device such as a key switch (hardware keys) or a touch sensor. A method of detecting an input by contact (touch) in a touch sensor may be a general detection method such as, for example, a resistive film method, an infrared method, an electromagnetic induction method, or a capacitance method. Note that, the multifunction peripheral 10 may include a touch panel in which the display 140 and the operation acceptor 150 are integrally formed.

The storage 160 stores various programs necessary for an operation of the multifunction peripheral 10, and various pieces of data. The storage 160 is configured of, for example, a storage device such as a solid state drive (SSD) being a semiconductor memory, or a hard disk drive (HDD).

In the multifunction peripheral 10, a print data storage area 162, an individual folder information storage area 164, the user information storage area 166, and a group information storage area 168 are secured as storage areas, and a setting table 170 is further stored.

The print data storage area 162 stores print data. The print data is data including information necessary for forming an image via the image former 130. The print data is, for example, content data such as an image file or a portable document format (PDF) file, page description language (PDL) data including a printing command executable by the multifunction peripheral 10, print (output) setting data, or the like, and may be data acquired by combining these pieces of data. Further, the print data may be job data indicating a job to be executed by the multifunction peripheral 10.

Further, in the present embodiment, the print data storage area 162 secures, as storage areas, a user folder storage area 1620, and an individual folder storage area 1622.

The user folder storage area 1620 stores a user folder. The user folder is a folder to be managed by the user who uses the multifunction peripheral 10, and is stored for each user who uses the multifunction peripheral 10. The user can store a file or print data in a user folder, or generate a folder. The user can also delete a file or a folder in a user folder at any timing. Note that, a function with which print data can be stored in a user folder to be managed by the user is also referred to as document filing. Since print data is stored in the multifunction peripheral 10, the user can form (print) an image based on print data stored in a user folder at any timing with use of the multifunction peripheral 10.

The individual folder storage area 1622 stores an individual folder. The individual folder is a folder that is automatically generated or deleted by the multifunction peripheral 10, and is a folder to be managed by the multifunction peripheral 10. In order to store data received from an external apparatus such as the information processing apparatus 20, an individual folder is automatically generated by the multifunction peripheral 10 at a timing at which the data is received. At this occasion, the individual folder is generated with a name based on information (e.g., a user name) on the user who uses the external apparatus that has transmitted data to the multifunction peripheral 10, or information (e.g., a computer name) on the external apparatus, and received print data is stored. Note that, in a case where the multifunction peripheral 10 receives print data from an external apparatus, and in a case where an individual folder associated with the external apparatus has already been generated, the multifunction peripheral 10 stores the print data in the individual folder. Further, for example, in a case where print data is not stored in an individual folder (in a case where the number of pieces of stored data is 0), the multifunction peripheral 10 deletes the individual folder.

The individual folder functions as, for example, a private mailbox. The private mailbox is a dedicated mailbox originally installed in a post office, and available to the user. When this is applied to an information processing apparatus, the private mailbox is an area where print data received or printed by the user are stored. In other words, the individual folder according to the present embodiment may be utilized when print data is managed, unlike a folder in a computer.

The individual folder information storage area 164 stores information (individual folder information) on settings for an individual folder. As illustrated in FIG. 3A, the individual folder information includes an individual folder name (e.g., "S117332 PC-10016L"), and presence or absence of fixed display (e.g., "presence"). An individual folder in which presence or absence of fixed display is "presence" indicates that the individual folder is fixedly displayed. On the other hand, an individual folder in which "presence" is not stored in presence or absence of fixed display indicates that the individual folder is not fixedly displayed.

The user information storage area 166 stores information (user information) related to the user of the multifunction peripheral 10. As illustrated in FIG. 3B, the user information includes a user name (e.g., "S117332"), a login name (e.g., "S117332"), a password (e.g., "ABC123"), and a belonging group (e.g., "Group 1") of the user. Note that, the user information may include information other than the above-described information. A login name and a password are used for user authentication. Further, the user name is displayed on a screen to be displayed by the multifunction peripheral 10, as information indicating the user who operates the multifunction peripheral 10. The user information may include information other than the above-described information.

The group information storage area 168 stores information (group information) on a group to which the user of the multifunction peripheral 10 belongs. As illustrated in FIG. 3C, the group information includes, for example, a group name (e.g., "Group1"). The group information may include information other than the above-described information.

The setting table 170 is a table that stores settings on the multifunction peripheral 10. As illustrated in FIG. 3D, the setting table 170 is a table in which, for example, a setting item name (e.g., "user authentication"), and a setting value (for example, "enable") for the setting item name are stored in association with each other.

As illustrated in D100 in FIG. 3D, the setting table 170 may include settings on a naming method of an individual folder. As setting values of the naming method of the individual folder, for example, "user name+computer name", "computer name+user name", "user name", and the like are stored. Setting values included in the setting table 170 are stored in advance by an administrator or the like of the multifunction peripheral 10.

The communicator 190 communicates with another apparatus or equipment such as the information processing apparatus 20 via a network such as a local area network (LAN) or a wide area network (WAN). The communicator 190 is configured of, for example, a communication device or a communication module such as a network interface card (NIC) for use in a wired/wireless LAN. Note that, the communicator 190 may include an interface (network I/F) connectable to a network.

1.2.2 Information Processing Apparatus

Figure 4:
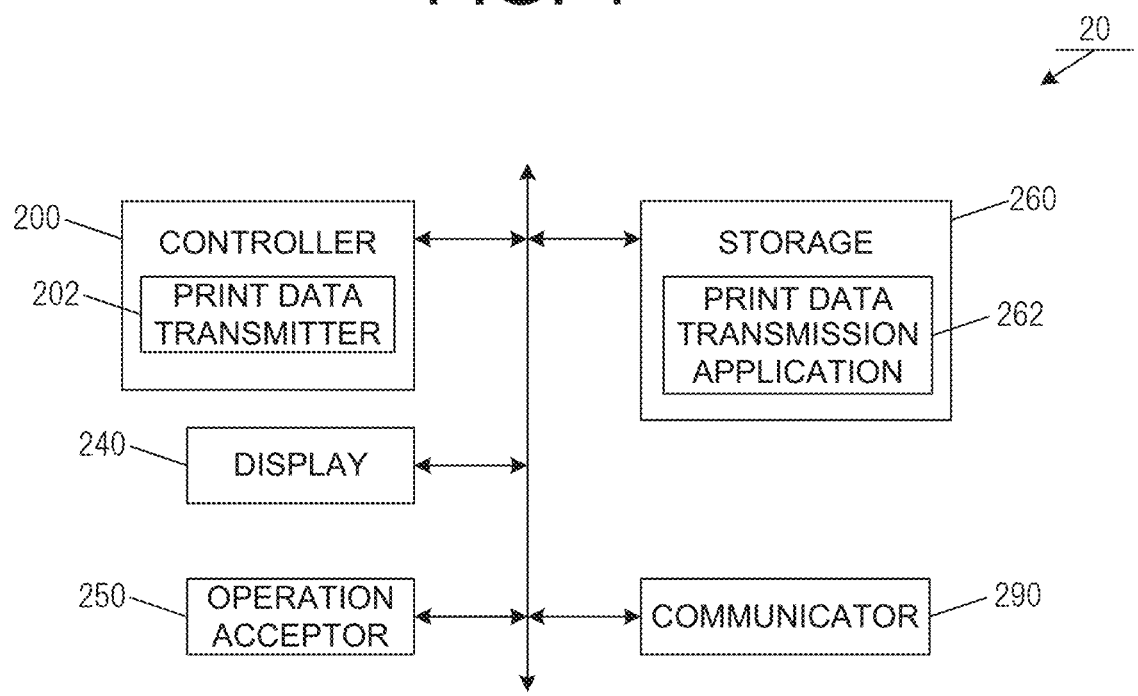
FIG. 4 is a diagram illustrating a functional configuration of an information processing apparatus according to the first embodiment.

A functional configuration of the information processing apparatus 20 is described with reference to FIG. 4. As illustrated in FIG. 4, the information processing apparatus 20 includes a controller 200, a display 240, an operation acceptor 250, a storage 260, and a communicator 290.

The controller 200 is a functional unit for controlling the entirety of the information processing apparatus 20. The controller 200 achieves various functions by reading and executing various programs stored in the storage 260, and is configured of, for example, one or a plurality of arithmetic devices (CPUs) or the like. Further, the controller 200 may be configured as an SoC having a plurality of functions among the functions described below.

The controller 200 functions as a print data transmitter 202 by executing a program stored in the storage 260. The print data transmitter 202 transmits print data to the multifunction peripheral 10. For example, the print data transmitter 202 transmits, to the multifunction peripheral 10, an image, a document, or a file for which printing has been instructed by the user, as print data. Note that, the print data transmitter 202 may transmit, to the multifunction peripheral 10, information such as a user name of the user who uses the information processing apparatus 20, and an apparatus name (computer name) of the information processing apparatus 20.

The display 240 displays various pieces of information. The display 240 is configured of, for example, a display device such as an LCD, an organic EL display, or a micro LED display. Note that, the display 240 may be configured as an interface connectable to another display device.

The operation acceptor 250 receives an operation instruction from the user who uses the multifunction peripheral 10. The operation acceptor 150 is configured of an input device such as a key switch (hardware keys) or a touch sensor. Note that, a touch panel in which the display 240 and the operation acceptor 250 are integrally formed may be mounted on the information processing apparatus 20. Further, the operation acceptor 250 may be configured as an interface connectable to an input device such as a keyboard or a mouse.

The storage 260 stores various programs necessary for an operation of the information processing apparatus 20, and various pieces of data. The storage 260 is configured of, for example, a storage device such as an SSD being a semiconductor memory, or an HDD.

The storage 260 stores a print data transmission application 262. The print data transmission application 262 is a program for achieving the print data transmitter 202. Note that, the print data transmission application 262 may be a printer driver.

The communicator 290 communicates with another apparatus or equipment such as the multifunction peripheral 10 via a network such as a LAN or a WAN. The communicator 290 is configured of, for example, a communication device or a communication module such as a NIC for use in a wired/wireless LAN. Note that, the communicator 290 may include an interface (network I/F) connectable to a network.

1.3 Flow of Processing

A flow of processing of the multifunction peripheral 10 according to the present embodiment is described with reference to FIGS. 5 to 8. The pieces of processing illustrated in FIGS. 5 to 8 are performed by reading a program stored in the storage 160 by the controller 100. Note that, regarding processing to be performed by the information processing apparatus 20, it is assumed that print data is transmitted to the multifunction peripheral 10 by the print data transmitter 202 in response to a user operation, and description thereof is omitted. Further, it is assumed that user information and group information are stored in advance in the multifunction peripheral 10, and setting values are stored in advance in the setting table 170.

1.3.1 Main Processing

Figure 5:
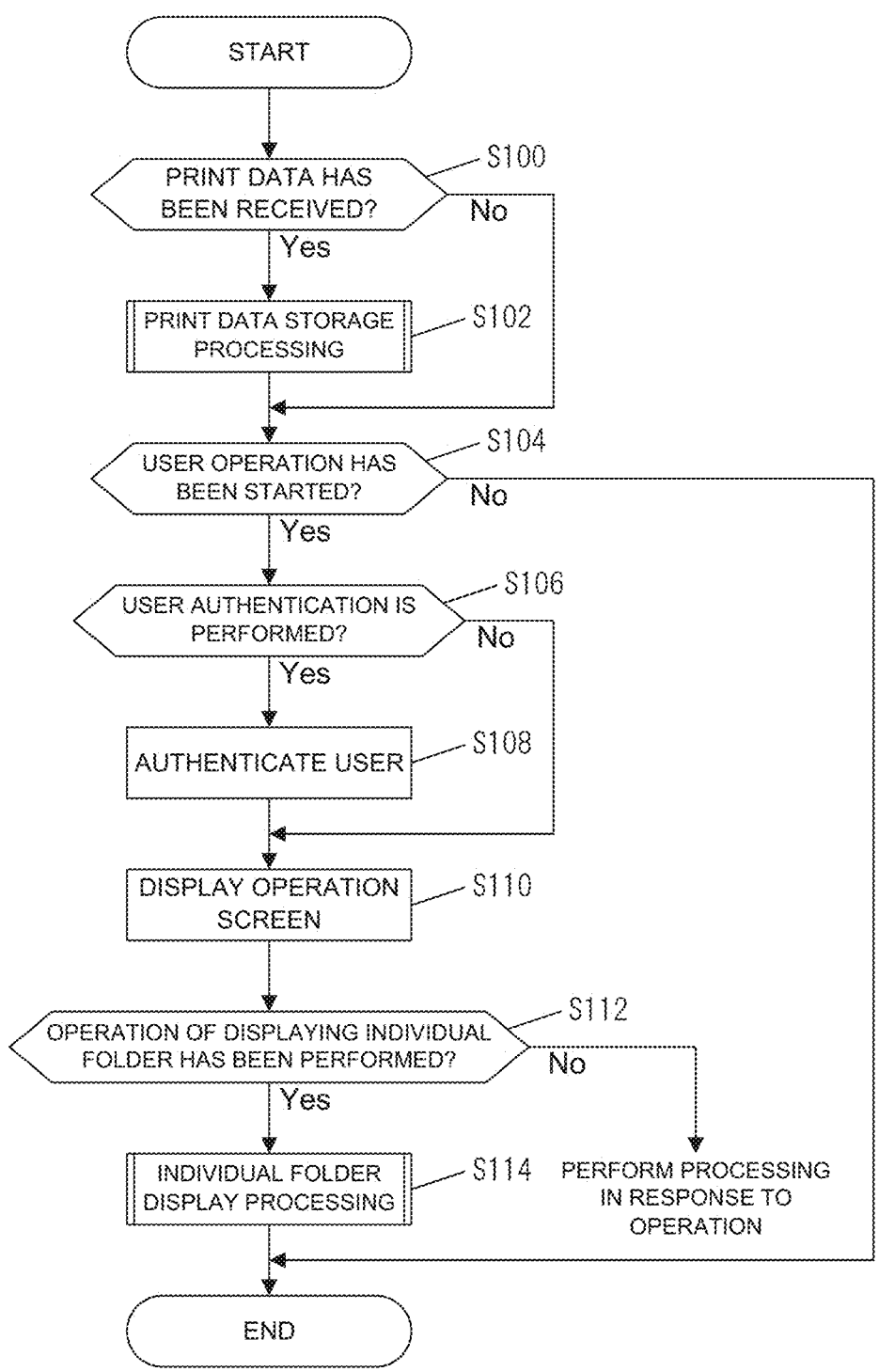
FIG. 5 is a flowchart of main processing of the multifunction peripheral according to the first embodiment.

A flow of main processing to be performed by the multifunction peripheral 10 is described with reference to FIG. 5. First, the controller 100 determines whether print data have been received from another apparatus (e.g., the information processing apparatus 20) via the communicator 190 (step S100).

In a case where print data have been received, the controller 100 performs print data storage processing of storing the print data (step S100; Yes→step S102). The print data storing processing is described later. Note that, in a case where it is determined that print data have not been received, the controller 100 omits the processing of step S102 (step S102; No).

Subsequently, the controller 100 determines whether the user has started operating the multifunction peripheral 10 (step S104). For example, in a case where the user starts an input operation via the operation acceptor 150, the controller 100 determines that the user has started operating the multifunction peripheral 10.

In a case where the user starts operating the multifunction peripheral 10, the controller 100 (user authenticator 104) determines whether to perform user authentication (step S104; Yes→step S106). For example, the user authenticator 104 refers to the setting table 170, and determines that user authentication is to be performed, in a case where the setting value of user authentication is "enabled".

In a case where user authentication is performed, the controller 100 (user authenticator 104) authenticates the user (step S106; Yes→step S108). For example, the user authenticator 104 displays, on the display 140, a screen for inputting a login name and a password, and authenticates the user, based on the login name and the password input by the user via the screen. Note that, in a case where the user cannot be authenticated, the controller 100 (user authenticator 104) may display, on the display 140, a screen indicating that the user cannot be authenticated, and perform the processing of step S108 again. In addition, in a case where user authentication is not performed, the controller 100 (user authenticator 104) omits the processing of step S108 (step S106; No).

Subsequently, the controller 100 displays, on the display 140, an operation screen of the multifunction peripheral 10 (step S110). The operation screen is, for example, a home screen for selecting a type of a job to be executed, or a job setting screen.

Subsequently, the controller 100 determines whether an operation of displaying an individual folder has been performed by the user (step S112). The operation of displaying an individual folder is, for example, an operation of selecting a button for displaying individual folders as a list.

In a case where an operation of displaying an individual folder is performed, the controller 100 performs individual folder display processing, which is processing of displaying an individual folder (step S112; Yes→step S114). The individual folder display processing is described later. On the other hand, in a case where an operation of displaying an individual folder has not been performed, the controller 100 performs predetermined processing in response to a user operation (step S112; No).

Further, in a case where it is determined in step S104 that the user has not started the operation, the controller 100 omits the pieces of processing from step S106 to step S114 (step S104; No). In this case, the controller 100 may set the multifunction peripheral 10 to a waiting state, or a standby state (power saving state).

1.3.2 Print Data Storage Processing

A flow of print data storage processing is described with reference to FIG. 6. First, the controller 100 acquires information on the apparatus that has transmitted the print data received in step S100, and determines a name of an individual folder associated with the apparatus, based on the apparatus information (step S120). Herein, since a setting value of a naming method of the individual folder is stored in the setting table 170, the controller 100 can determine the name of the individual folder according to the setting value.

Subsequently, the controller 100 determines whether the individual folder to which the name determined in step S120 is assigned is present in the individual folder storage area 1622 (step S122). In other words, the controller 100 determines whether there is an individual folder to which a name based on information on the apparatus that has transmitted print data is assigned.

In a case where an individual folder is not present, the controller 100 generates, in the individual folder storage area 1622, an individual folder to which the name determined in step S120 is assigned (step S122; Yes→step S124). Thus, an individual folder including, in a name, an apparatus name (computer name) of an apparatus that has transmitted print data, and a user name of the apparatus, is generated in the individual folder storage area 1622, and the individual folder is associated with user information, or the information on the apparatus that has transmitted the print data. Note that, in step S124, the controller 100 stores, in the individual folder information storage area 164, individual folder information including the name of the generated individual folder, and in which presence or absence of fixed display of the individual folder information is empty. On the other hand, in a case where there is an individual folder that stores print data, the controller 100 omits the processing of step S124 (step S122; No).

Subsequently, the controller 100 stores the print data in the individual folder to which the name determined in step S120 is assigned (step S126). Thus, print data transmitted from an external apparatus such as the information processing apparatus 20 are stored in an individual folder to which a name based on information on the external apparatus is assigned.

1.3.3 Individual Folder Display Processing

Figure 7:
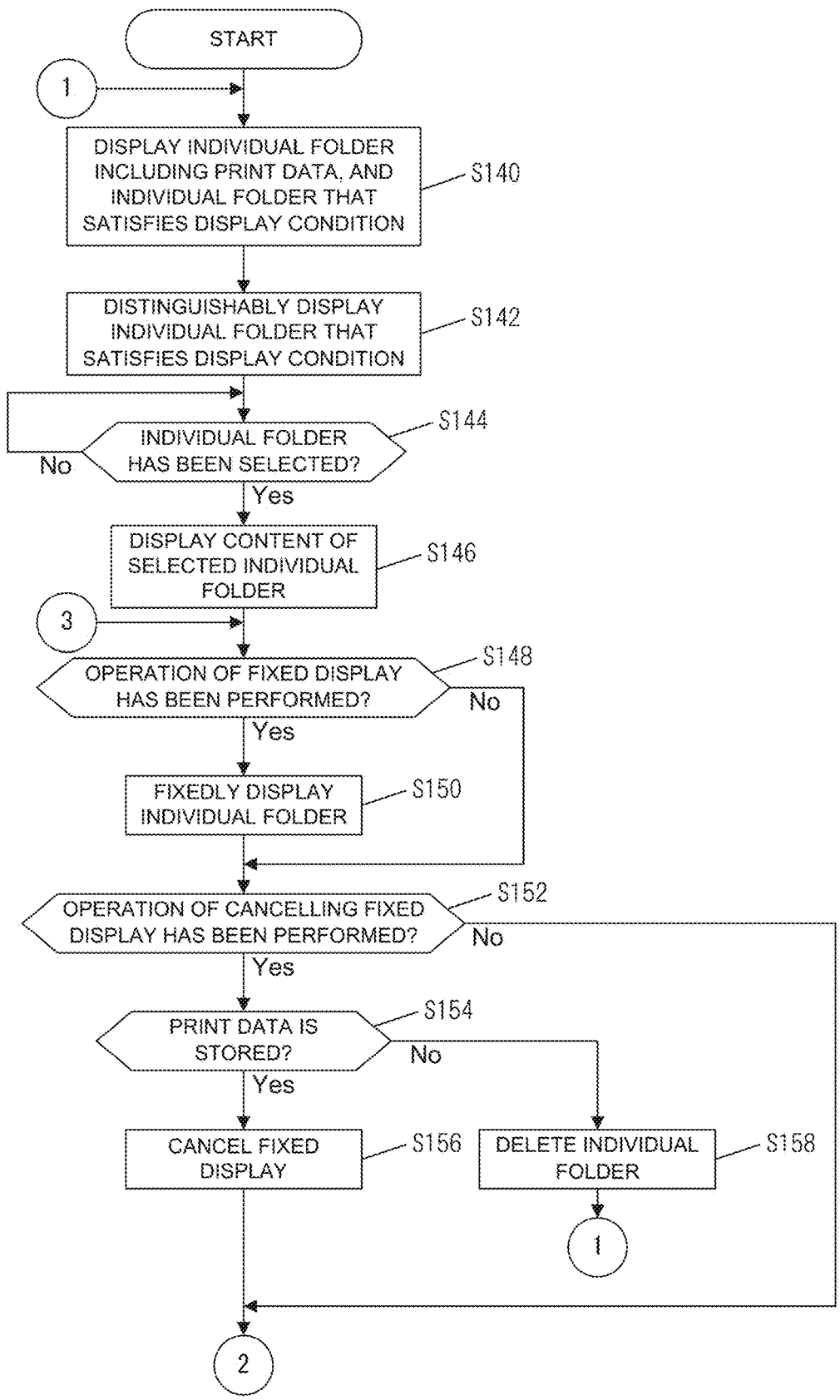
FIG. 7 is a flowchart of individual folder display processing according to the first embodiment.

A flow of individual folder display processing is described with reference to FIGS. 7 and 8. First, processing described in FIG. 7 is described.

The controller 100 displays, on the display 140, an individual folder including print data, and an individual folder that satisfies a display condition (step S140). For example, the controller 100 displays a list of individual folders by displaying, on the display 140, a screen on which buttons indicating names of individual folders stored in the individual folder storage area 1622 are arranged. Note that, the screen on which individual folders are displayed as a list is also referred to as an individual folder list screen.

Further, in the present embodiment, it is assumed that a display condition is that setting is performed to fixedly display an individual folder. Therefore, in addition to a specific folder that stores print data, the controller 100 displays a specific folder that is set to be fixedly displayed. Thus, a fixedly displayed specific folder is displayed on an individual folder list screen, regardless of whether or not print data is stored in the specific folder.

Note that, in the present embodiment, in processing to be described later, the controller 100 deletes, from the individual folder storage area 1622, an individual folder that does not store print data, and that is not fixedly displayed. In other words, an individual folder that does not store print data, and that is not fixedly displayed is not stored in the individual folder storage area 1622. Therefore, in step S140, the controller 100 may display an individual folder stored in the individual folder storage area 1622 as it is.

Subsequently, the controller 100 distinguishably displays an individual folder that satisfies the display condition among the individual folders displayed in step S140 (step S142). In other words, the controller 100 displays an individual folder that satisfies the display condition, and an individual folder that does not satisfy the display condition in a distinguishable manner. For example, the controller 100 displays an icon on a button of an individual folder that satisfies the display condition. Note that, the controller 100 may change the character color or the background color of a button of an individual folder that satisfies the display condition to a color different from the character color or the background color of a button of an individual folder that does not satisfy the display condition, or may thicken the frame line of a button of an individual folder that satisfies the display condition.

Subsequently, the controller 100 determines whether one individual folder has been selected by the user (step S144). In a case where one individual folder has not been selected, the controller 100 repeats the processing of step S144 (step S144; No). On the other hand, in a case where one individual folder has been selected, the controller 100 displays a content of the selected individual folder on the display 140 (step S144; Yes→step S146). The content of the individual folder is print data included in the individual folder. For example, the controller 100 displays, as a list, information such as a name of print data, and a reception date and time of print data.

Subsequently, the controller 100 determines whether an operation of fixedly displaying the individual folder selected in step S146 has been performed (step S148). The operation of fixedly displaying the individual folder is, for example, an operation of selecting a button for giving an instruction to fixedly display the individual folder. Note that, an instruction or an operation of fixedly displaying an individual folder is also referred to as pinning.

When an operation of fixedly displaying an individual folder is performed, the controller 100 fixedly displays the individual folder (step S148; Yes→step S150). For example, the controller 100 stores "presence" in presence or absence of fixed display included in individual folder information associated with an individual folder for which an operation for fixed display has been performed. Thus, the controller 100 can perform settings on fixed display for an individual folder. Note that, in a case where an operation of fixedly displaying an individual folder has not been performed, the controller 100 omits the processing of step S150 (step S150; No).

Subsequently, the controller 100 determines whether the user has performed an operation of canceling fixed display of the individual folder selected in step S144 (step S152).

In a case where an operation of canceling fixed display of the individual folder has been performed, the controller 100 determines whether print data is stored in the individual folder (step S152; Yes→step S154).

In a case where print data is stored in the individual folder, the controller 100 cancels fixed display of the individual folder (step S154; Yes→step S156). For example, the controller 100 deletes the information "presence" from presence or absence of fixed display included in individual folder information associated with the individual folder for which an operation of canceling fixed display has been performed. Thus, the controller 100 can cancel settings on fixed display for an individual folder, and can return the individual folder to a state in which fixed display is not performed.

On the other hand, in a case where print data is not stored in the individual folder, the controller 100 deletes the individual folder from the individual folder storage area 1622, and then returns to step S140 (step S154; No→step S158→step S140). In this case, the deleted individual folder is not displayed on the individual folder list screen. In other words, an individual folder that does not store print data, and that does not satisfy the display condition is hidden. Note that, when deleting an individual folder, the controller 100 deletes individual folder information associated with the individual folder from the individual folder storage area 1622.

In addition, in step S152, in a case where it is determined that an operation of canceling fixed display of the individual folder has not been performed, the controller 100 omits the pieces of processing from step S154 to step S158 (step S152; No).

As described above, the controller 100 can switch settings on presence or absence of fixed display of an individual folder in response to a user operation by performing the pieces of processing from step S148 to step S158. Further, the controller 100 can hide an individual folder at a timing when fixed display of the individual folder that does not store print data is canceled.

Figure 8:
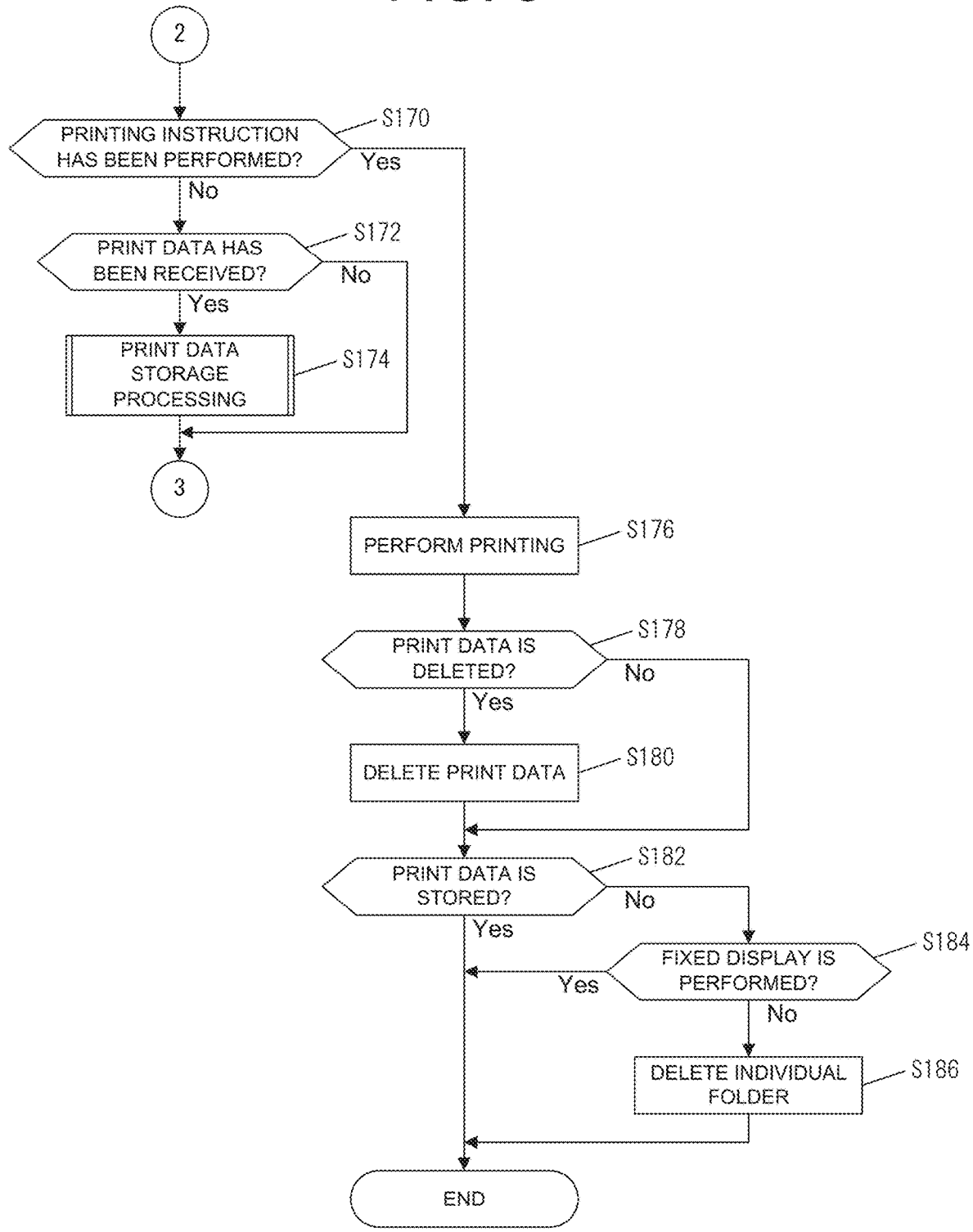
FIG. 8 is a flowchart of the individual folder display processing according to the first embodiment.

Next, processing described in FIG. 8 is described. The controller 100 determines whether a print instruction has been given by the user (step S170). For example, the controller 100 determines that a print instruction has been given, in a case where one piece of print data has been selected from among the print data displayed in step S146, and an operation of starting to form (output) an image based on the one piece of print data has been performed.

In a case where a print instruction has not been given, the controller 100 determines whether print data have been received (step S170; No→step S172). In a case where print data have been received, the print data storage processing illustrated in FIG. 6 is performed, and the processing returns to step S148 in FIG. 7 (step S172; Yes→step S174→step S148). Further, in a case where print data have not been received, the controller 100 omits the processing of step S174, and the processing returns to step S148 in FIG. 7 (step S172; No→step S148).

On the other hand, in a case where it is determined in step S170 that a print instruction has been given, the controller 100 performs printing (step S170; Yes→step S176). For example, the controller 100 outputs (prints) an image based on the print data selected in step S170 via the image former 130.

Next, the controller 100 determines whether to delete the print data selected in step S170 (print data for which printing has been performed) (step S178). For example, the controller 100 displays, on the display 140, a message inquiring whether to delete the print data, and determines to delete the print data, in a case where the user selects to delete the print data.

In a case where the print data is deleted, the controller 100 deletes the print data selected in step S170 (step S178; Yes→step S180). Note that, in a case where the print data is not deleted, the controller 100 omits the processing of step S180 (step S178; No).

Subsequently, the controller 100 determines whether print data is stored in the individual folder selected in step S144 of FIG. 7 (step S182). In a case where print data is not stored in the individual folder selected in step S144 in FIG. 7 (in a case where the number of pieces of data in the individual folder is 0), the controller 100 determines whether the individual folder is fixedly displayed (step S182; No→step S184). For example, in a case where "presence" is stored as presence or absence of fixed display included in individual folder information associated with the individual folder selected in step S144, the controller 100 determines that the individual folder is fixedly displayed.

In a case where the individual folder is not fixedly displayed, the individual folder selected in step S144 in FIG. 7 is deleted from the individual folder storage area 1622 (step S184; No→step S186). Note that, the controller 100 deletes, from the individual folder storage area 1622, individual folder information associated with an individual folder to be deleted. On the other hand, in a case where the individual folder is fixedly displayed, the controller 100 omits the processing of step S186 (step S184; Yes). In this case, the individual folder is not deleted.

Further, in a case where it is determined in step S182 that print data is stored in the individual folder (in a case where the number of pieces of data in the individual folder is one or more), the controller 100 omits the pieces of processing of step S184 and step S186 (step S182; Yes).

1.4 Operation Example

Figure 9A:
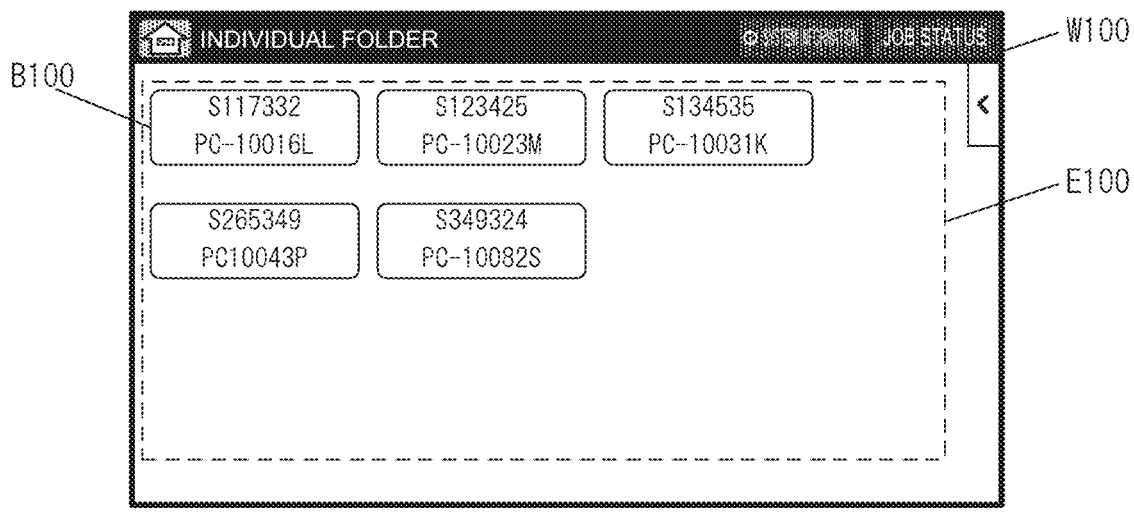
FIGS. 9A and 9B are diagrams illustrating an operation example according to the first embodiment.

FIGS. 9A to 12C are diagrams illustrating screen examples of a screen to be displayed on the display 140. FIG. 9A is a diagram illustrating a screen example of an individual folder list screen W100. The individual folder list screen W100 includes an area E100 where a button indicating a name of an individual folder is arranged. The name of the individual folder is configured to include, for example, a user name of the user who has transmitted print data, and a name (computer name) of an apparatus that has transmitted the print data. In this case, the area E100 includes a button (for example, a button B100 indicated as "S117332 PC-10016L") indicating a name acquired by combining a user name and a computer name.

Figure 9B:
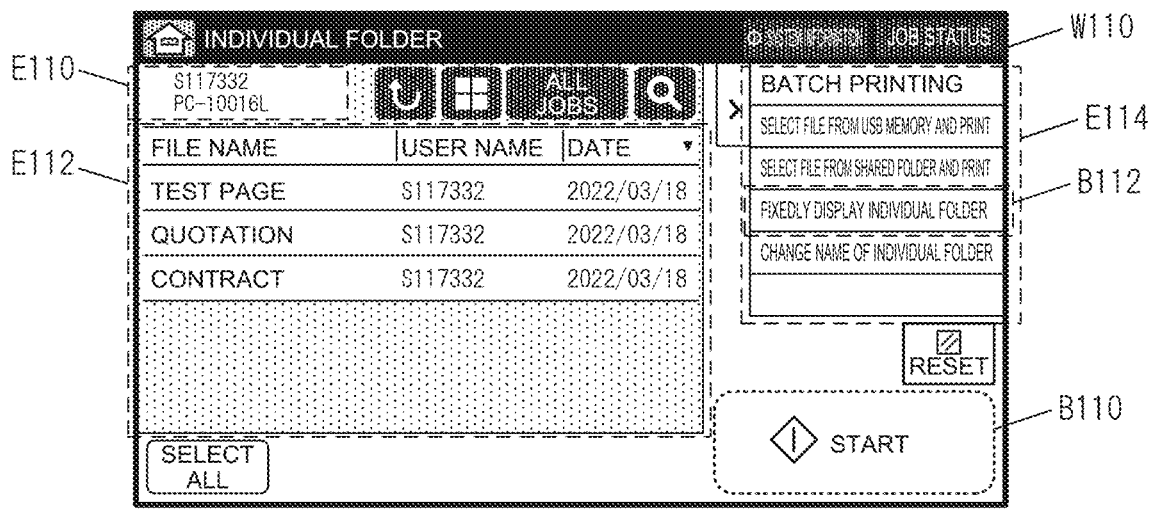

FIG. 9B is a diagram illustrating a screen example of a screen W110 to be displayed in a case where a button B100 displayed on the individual folder list screen W100 is selected. The screen W110 is a screen that displays a content of an individual folder selected on the individual folder list screen W100. The screen W110 includes an area E110 where a name of an individual folder is displayed, and an area E112 where a list of pieces of print data stored in the individual folder is displayed. Further, the screen W110 includes a button B110 that instructs to print an image based on print data selected from the area E112.

Further, an area E114 (action panel) where a button for performing an operation associated with a displayed screen is arranged is displayed on the screen W110. The area E114 includes a button B112 for fixedly displaying an individual folder. The user can fixedly display an individual folder displayed on the screen W110 by selecting the button B112.

Figure 10A:
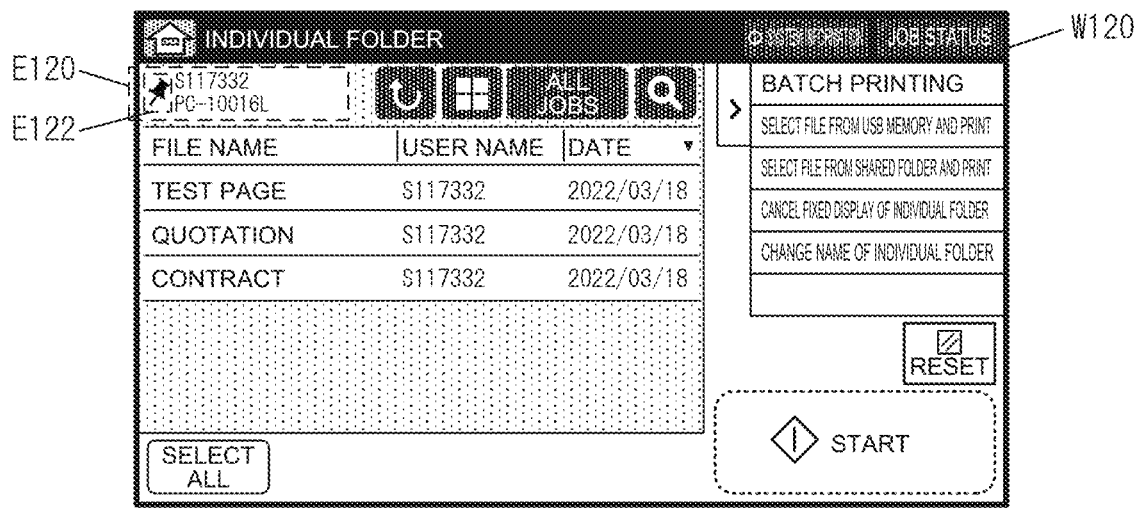
FIGS. 10A and 10B are diagrams illustrating an operation example according to the first embodiment.

FIG. 10A is a diagram illustrating a screen example of a screen W120 to be displayed in a case where the button B112 displayed on the screen W110 is selected. As illustrated in FIG. 10A, an icon E122 indicating that an individual folder is fixedly displayed is displayed in an area E120 where the name of the individual folder is displayed. By viewing the icon E122, the user can recognize that the individual folder displayed on the screen W120 is fixedly displayed. The icon E122 is displayed in a pinned state. In other words, the icon E122 is a pin-shaped icon. Since the individual folder is displayed in the form of a pin-shaped icon, the user can visually recognize that the individual folder is displayed in a pinned state. The user can easily recognize that the individual folder is fixedly displayed more intuitively in combination with the pin-shaped icon. Hereinafter, a pin-shaped icon is simply referred to as an icon in the drawings as well. Further, the icon may have a shape other than the pin shape, for example, a shape of a clip or the like, as long as it is easy for the user to visually recognize that an individual folder is fixedly displayed.

Figure 10B:
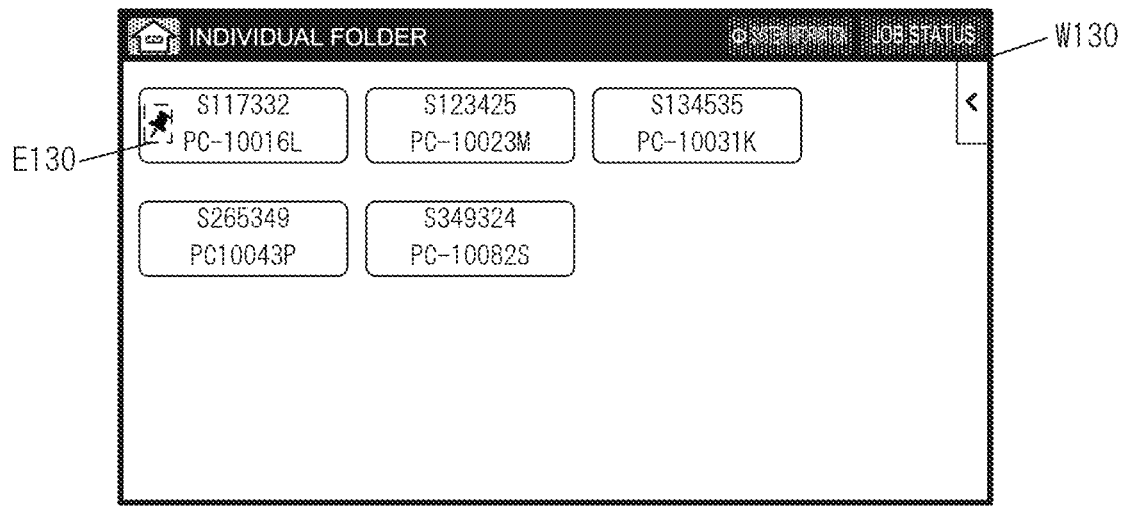

Further, FIG. 10B is a diagram illustrating a screen example of an individual folder list screen W130 to be displayed in a case where a fixedly displayed individual folder is included. As illustrated in FIG. 10B, an icon E130 indicating that an individual folder is fixedly displayed is displayed together with the name of the individual folder. By viewing the icon E130, the user can recognize that the individual folder in which the icon E130 is displayed is fixedly displayed.

Figure 11A:
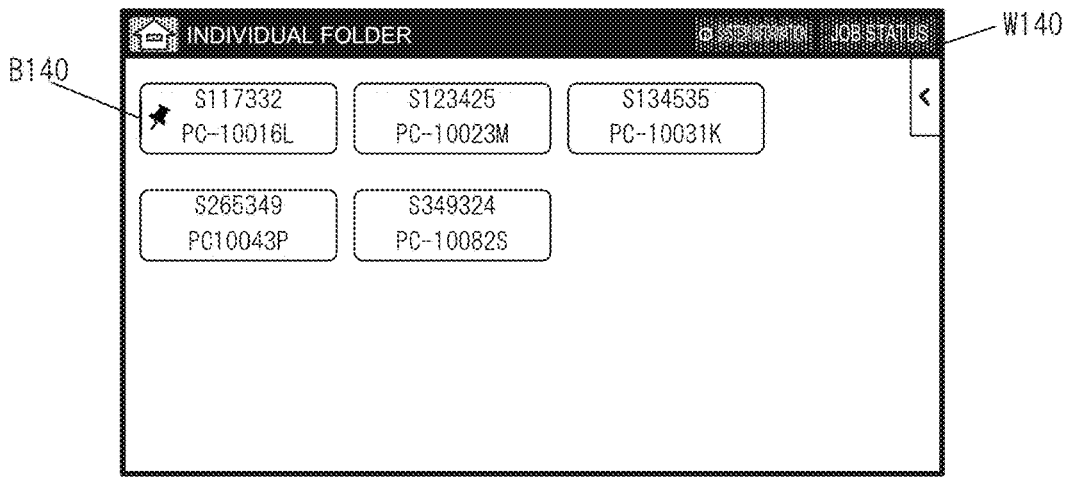
FIGS. 11A to 11C are diagrams illustrating an operation example according to the first embodiment.
Figure 11B:
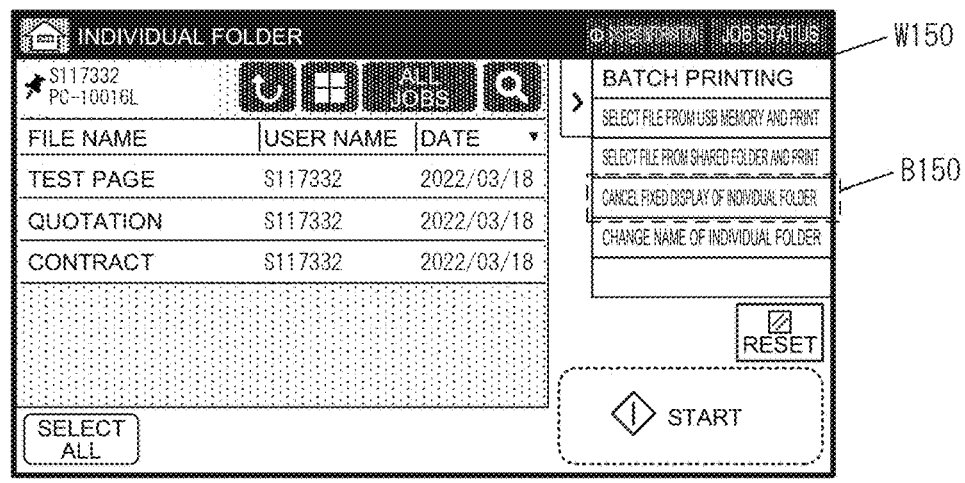

FIG. 11A is a screen W140 similarly to FIG. 10B. Herein, in a case where the user selects a button B140 on which an icon indicating that an individual folder is fixedly displayed is displayed, a screen W150 illustrated in FIG. 11B is displayed. The screen W150 is a screen that displays a content of an individual folder selected by the user. The screen W150 includes a button B150 for canceling fixed display. The user can cancel fixed display of an individual folder by selecting the button B150.

Figure 11C:
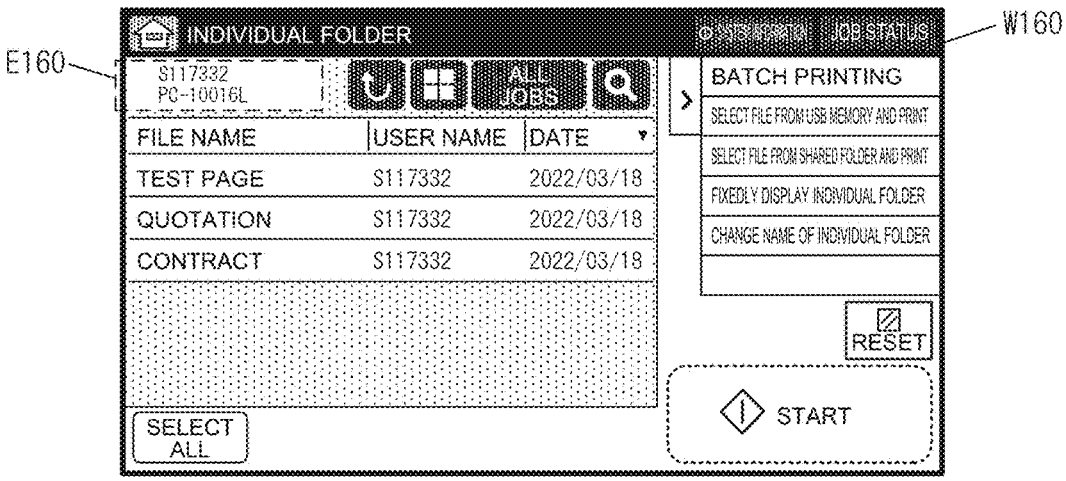

FIG. 11C is a diagram illustrating a screen example of a screen W160 to be displayed in a case where an operation of canceling fixed display is performed on the screen W150. As illustrated in FIG. 11C, an icon indicating that an individual folder is fixedly displayed is not displayed in an area E160 where a name of an individual folder is displayed. By viewing the area E160, the user can recognize that an individual folder displayed on the screen W160 is not fixedly displayed.

Figure 12A:
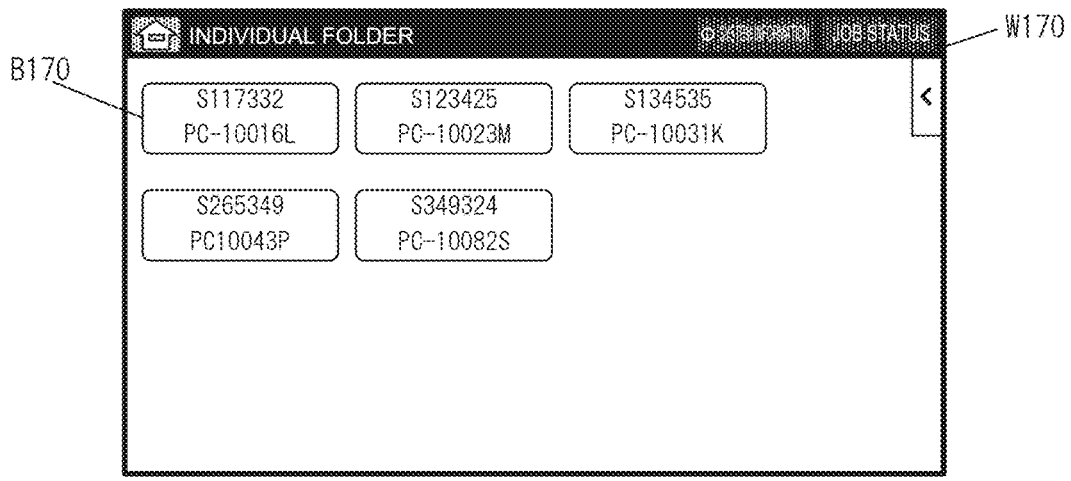
FIGS. 12A to 12C are diagrams illustrating an operation example according to the first embodiment.

Further, FIG. 12A is a diagram illustrating a screen example of an individual folder list screen W170. The button B140 in FIG. 11A, and a button B170 in FIG. 12A are buttons for selecting an individual folder having the same name ("S117332 PC-10016L"). Herein, in a case where fixed display is canceled, the icon indicating that an individual folder is fixedly displayed is hidden from the button, and only the name of the individual folder is displayed, as exemplified by the button B170. The user can recognize that the individual folder associated with the button is not fixedly displayed by confirming that the icon indicating that the individual folder is fixedly displayed on the button is not displayed.

Figure 12B:
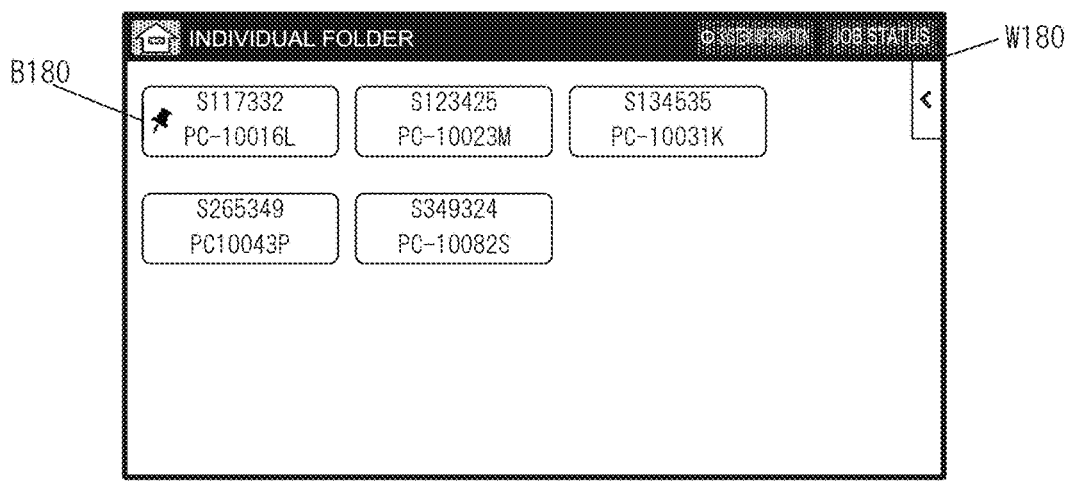
Figure 12C:
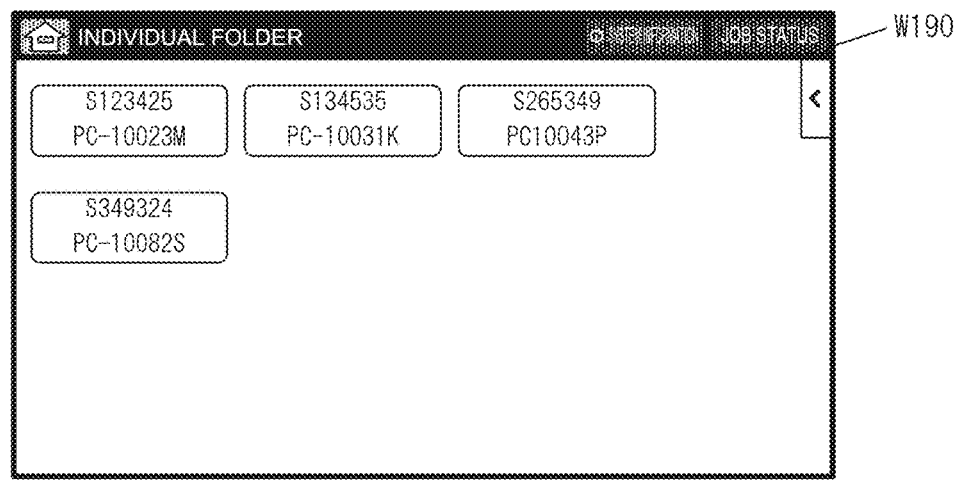

FIG. 12B is a diagram illustrating a screen example of an individual folder list screen W180. Herein, a button B180 is a button associated with an individual folder having the name "S117332 PC-10016L". Even in a case where print data is not stored in the individual folder having the name "S117332 PC-10016L", in a case where the display condition is satisfied, the button is displayed as illustrated in FIG. 12B.

On the other hand, in FIG. 12B, in a case where the individual folder having the name "S117332 PC-10016L" does not satisfy the display condition (in a case where fixed display is canceled), the folder is hidden. In this case, as illustrated by a screen example of an individual folder list screen W190 illustrated in FIG. 12C, a button associated with the individual folder having the name "S117332 PC-10016L" is not displayed.

Note that, in the above description, an operation for fixedly displaying an individual folder has been described as an operation of selecting a button for fixedly displaying an individual folder on a screen on which a content of an individual folder is displayed, but other operations may be performed. For example, an operation for fixedly displaying an individual folder may be an operation of pressing a button on which a name of an individual folder is displayed for a long time on an individual folder list screen, or may be a predetermined gesture operation.

Further, in the above description, an individual folder that does not store print data, and that is not fixedly displayed is deleted, but the individual folder may not be deleted. In this case, in step S140 in FIG. 7, the controller 100 displays, among individual folders stored in the individual folder storage area 1622, an individual folder that stores print data, and an individual folder that does not store print data and that is fixedly displayed. Thus, the controller 100 can hide, among individual folders stored in the individual folder storage area 1622, an individual folder that does not store print data, and that is not fixedly displayed.

Further, in the above description, a case has been described in which the user performs an operation of fixed display, and an operation of canceling fixed display, but the operation by the user may be disabled. For example, a user such as an administrator of the multifunction peripheral 10 stores, in the setting table 170, a setting value that constantly and fixedly displays an individual folder. In this case, the controller 100 does not display a button for fixed display, or a button for canceling fixed display. In addition, when an individual folder is generated, the controller 100 sets the individual folder to a fixedly displayed state. Thus, individual folders are fixedly displayed in a batch manner, and are displayed in step S140, even in a case where print data is not stored. Consequently, an operation in which a generated individual folder is not hidden (not deleted) is achieved.

As described above, when individual folders to be automatically generated or deleted are displayed as a list, the multifunction peripheral according to the present embodiment displays, on a screen, an individual folder that is set to be fixedly displayed, regardless of whether or not print data is stored. Thus, even in a state in which data is not stored in an individual folder (a state in which a content of an individual folder is empty), the individual folder is continued to be displayed, and presence or absence of display of the individual folder is fixed. Fixing presence or absence of display of an individual folder reduces a behavior that a display position of an individual folder changes. Thus, the multifunction peripheral according to the present embodiment can reduce time and effort for the user to search for an individual folder, and achieve improvement of operability in so-called private mailbox printing.

2. Second Embodiment

Next, a second embodiment is described. The second embodiment is an embodiment in which, in addition to the processing described in the first embodiment, in a case where a name of an individual folder is changed, settings are made in such a way as to fixedly display the individual folder. In the present embodiment, FIG. 3A of the first embodiment is replaced with FIG. 13, and FIG. 7 of the first embodiment is replaced with FIG. 14. Note that, the same processing is denoted by the same reference sign, and description thereof is omitted.

2.1 Functional Configuration

FIG. 13 is a diagram illustrating an example of a data configuration of individual folder information according to the present embodiment. The individual folder information according to the present embodiment further includes a user name (e.g., "S117332"), and a computer name (e.g., "PC-10016L"), in addition to an individual folder name, and presence or absence of fixed display.

2.2 Flow of Processing

2.2.1 Print Data Storage Processing

Figure 6:
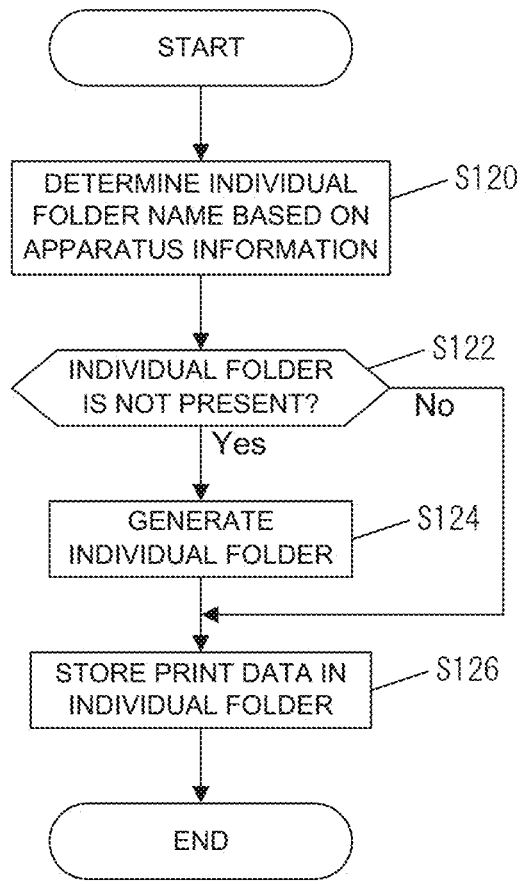
FIG. 6 is a flowchart of print data storage processing according to the first embodiment.

In the present embodiment, as print data storage processing, a controller 100 performs processing similar to the processing illustrated in FIG. 6. Note that, in the present embodiment, in step S120 in FIG. 6, the controller 100 acquires, from an individual folder information storage area 164, individual folder information including information (e.g., a user name and a computer name) on an apparatus that has transmitted print data. In a case where the controller 100 can acquire individual folder information, the controller 100 determines, as a name of an individual folder that stores print data, an individual folder name included in the individual folder information. On the other hand, in a case where the controller 100 cannot acquire individual folder information, the controller 100 determines a name of an individual folder associated with an apparatus, based on the information on the apparatus that has transmitted print data.

Further, in step S124, the controller 100 stores, in the individual folder information storage area 164, individual folder information including a name of a generated individual folder, and information (e.g., a user name and a computer name) on an apparatus that has transmitted print data, and in which presence or absence of fixed display of individual folder information is empty.

2.2.2 Individual Folder Display Processing

A flow of individual folder display processing according to the present embodiment is described with reference to FIG. 14. In the present embodiment, in a case where it is determined that an operation of fixedly displaying an individual folder has not been performed in step S148, the controller 100 determines whether an operation of changing the name of the individual folder has been performed (step S148; No→step S200).

In a case where an operation of changing the name of the individual folder has been performed, the controller 100 fixedly displays the individual folder (step S200; Yes→step S150). For example, the controller 100 displays, on the display 140, a screen for inputting a name of an individual folder, and acquires the name of the new individual folder, based on a user operation. Further, the controller 100 stores, in the individual folder information associated with the individual folder selected in step S144, the acquired name of the individual folder, as the individual folder name, and stores "presence" in presence or absence of fixed display. On the other hand, in a case where an operation of changing the name of the individual folder has not been performed, the controller 100 omits the processing of step S150 (step S200; No).

Figure 14:
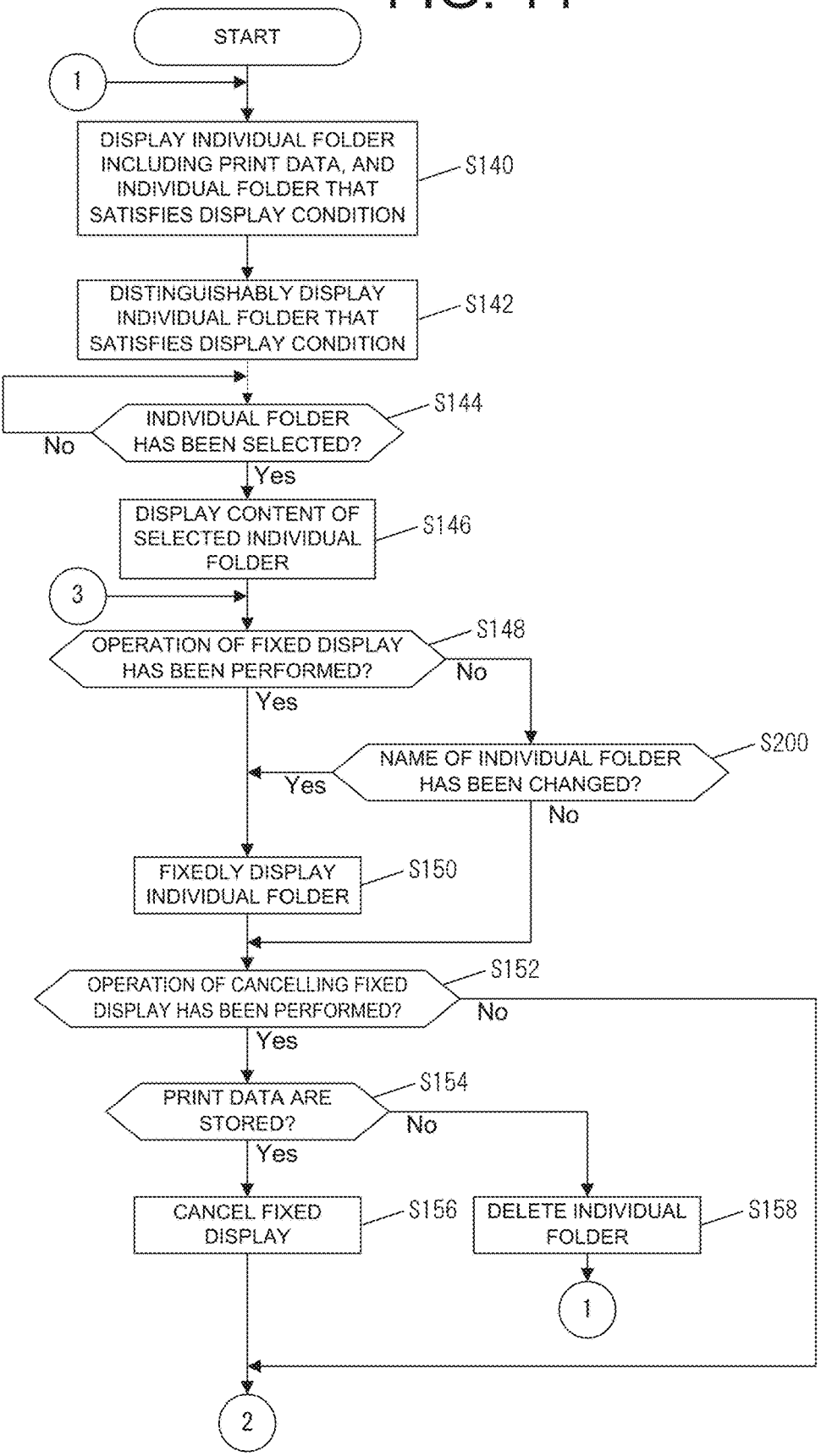
FIG. 14 is a flowchart of individual folder display processing according to the second embodiment.

Note that, the controller 100 cancels fixed display, based on a user operation, in a case where an operation of changing the name of the individual folder has been performed by performing the pieces of processing from step S152 to step S158 in FIG. 14.

2.3 Operation Example

Figure 15A:
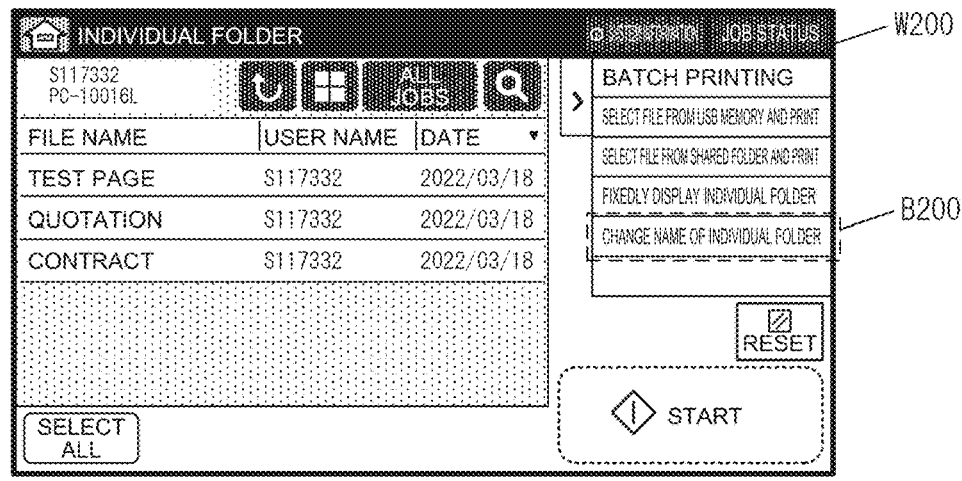
FIGS. 15A to 15C are diagrams illustrating an operation example according to the second embodiment.
Figure 15B:
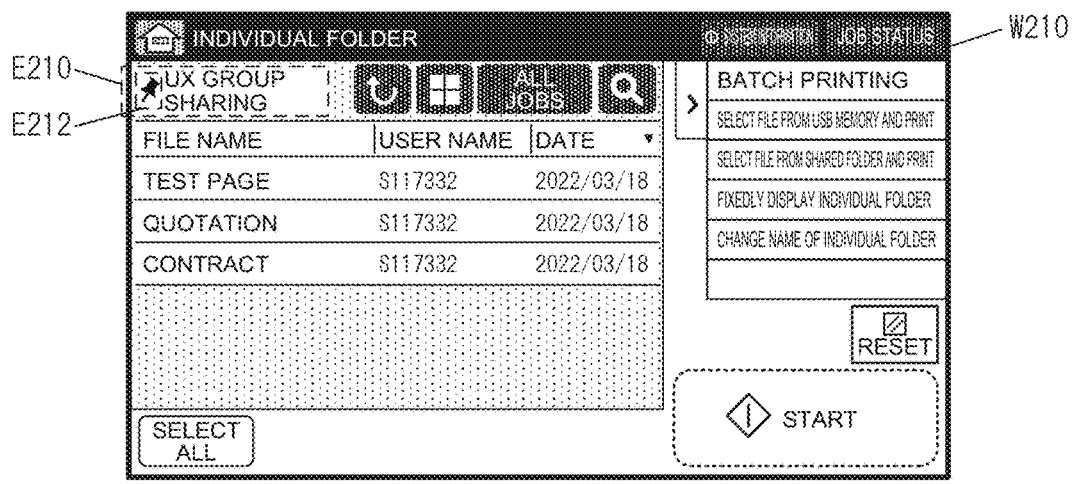
Figure 15C:
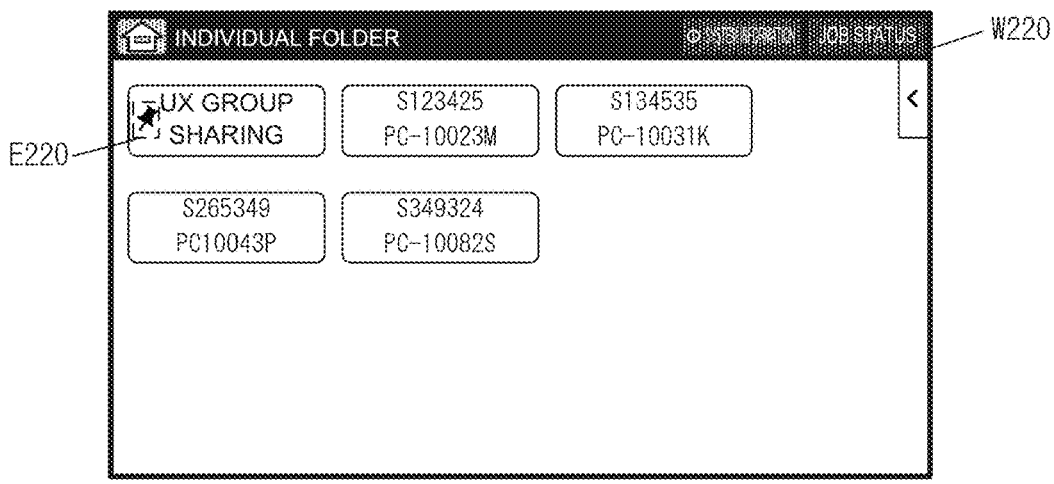

FIGS. 15A to 15C are diagrams illustrating screen examples of a screen to be displayed on the display 140. FIG. 15A is a diagram illustrating a screen example of a screen W200 to be displayed in a case where one individual folder is selected on the individual folder list screen W100 illustrated in FIG. 9A. The screen W200 includes a button B200 for changing the name of the individual folder. The user can change the name of the individual folder displayed on the screen W200 by selecting the button B200.

FIG. 15B is a diagram illustrating a screen example of a screen W210 to be displayed after the name of the individual folder has been changed. The screen W210 is a screen example in a case where the name of the individual folder is changed from "S117332 PC-10016L" to "UX group sharing". In the present embodiment, when the name of an individual folder is changed, the individual folder is fixedly displayed. Therefore, as illustrated in FIG. 15B, an icon E212 indicating that an individual folder is fixedly displayed is displayed in an area E210 where the name of the individual folder is displayed. Further, FIG. 15C is a diagram illustrating a screen example of an individual folder list screen W220. As illustrated in FIG. 15C, an icon E220 indicating that an individual folder is fixedly displayed is displayed together with the name of the changed individual folder.

As described above, in a case where the name of an individual folder is changed, the multifunction peripheral according to the present embodiment fixedly displays the individual folder. Thus, in a case where the name of an individual folder is changed, the multifunction peripheral according to the present embodiment can automatically and fixedly display the individual folder, based on an assumption that the user intends to leave the individual folder.

3. Third Embodiment

Next, a third embodiment is described. The third embodiment includes a case where a password is set for an individual folder, as a display condition, in addition to the processing described in the first embodiment. In the present embodiment, FIG. 3A of the first embodiment is replaced with FIG. 16, FIG. 7 of the first embodiment is replaced with FIG. 17, and FIG. 8 of the first embodiment is replaced with FIG. 18. Note that, the same processing is denoted by the same reference sign, and description thereof is omitted.

3.1 Functional Configuration

FIG. 16 is a diagram illustrating an example of a data configuration of individual folder information according to the present embodiment. The individual folder information according to the present embodiment further includes a password (e.g., "abc123"), in addition to an individual folder name, and presence or absence of fixed display.

A password of an individual folder is set, for example, to protect the individual folder. In this case, in a case where an operation of displaying a content of an individual folder for which a password is set has been performed, the user is requested to input the password. Only in a case where a password input by the user matches the password set for the individual folder selected by the user, the content of the individual folder is displayed. Note that, in a case where a password is not set for an individual folder, and in a case where the individual folder is selected, the content of the individual folder is displayed without requesting the user to input the password.

Note that, in the present embodiment, a case that a password is set for an individual folder means a case that a value of a password is stored in individual folder information associated with the individual folder. Further, a case that a password is not set for an individual folder means a case that a value of a password is not stored in individual folder information associated with the individual folder.

3.2 Flow of Processing

Figure 17:
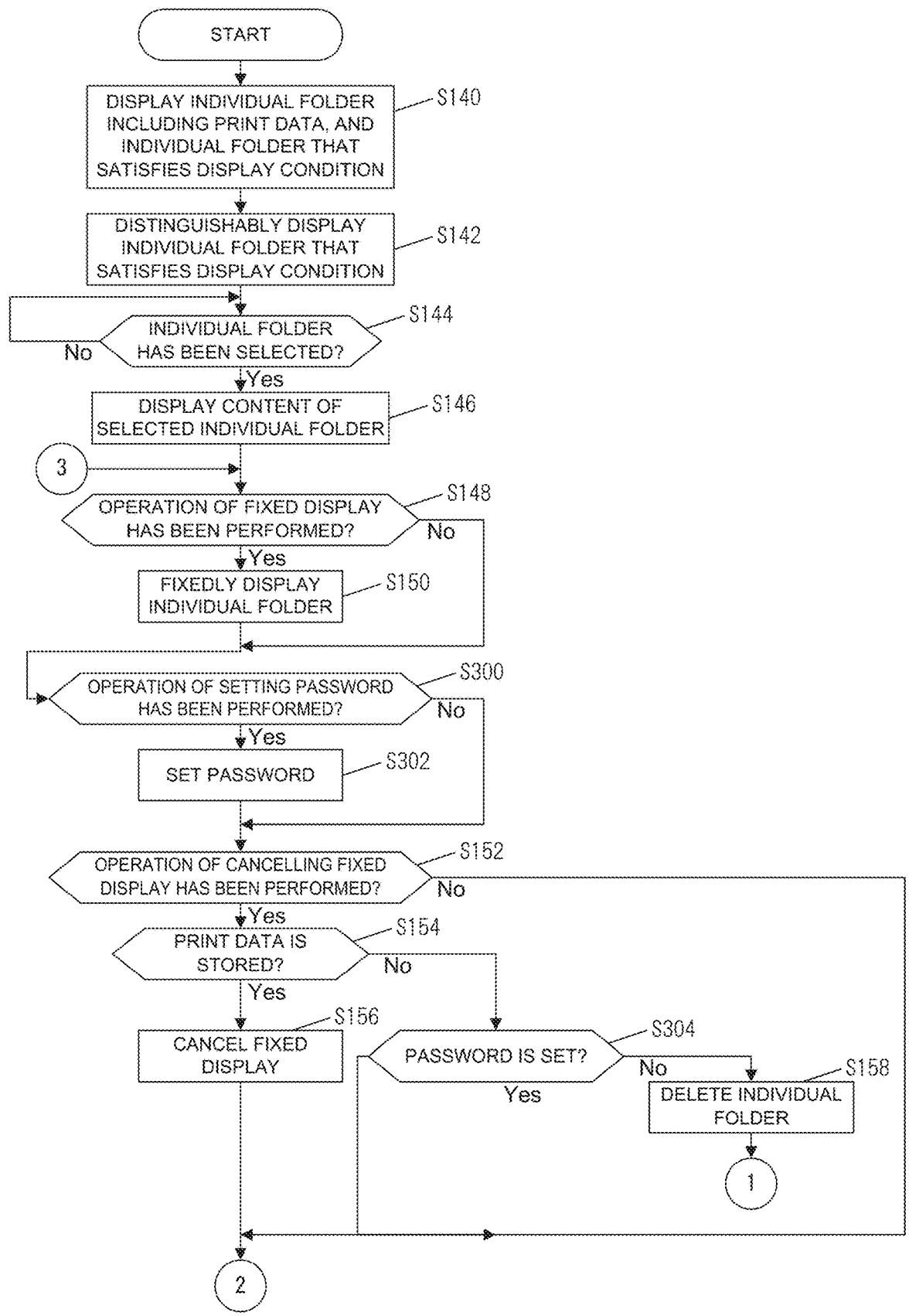
FIG. 17 is a flowchart of individual folder display processing according to the third embodiment.

A flow of individual folder display processing according to the present embodiment is described with reference to FIGS. 17 and 18. First, processing illustrated in FIG. 17 is described. In the present embodiment, in step S140, the controller 100 displays, as an individual folder that satisfies the display condition, an individual folder that is fixedly displayed, and for which a password is set.

Further, after performing the processing of step S148 or step S150, the controller 100 determines whether an operation of changing the password of the individual folder selected in step S144 has been performed (step S300).

In a case where an operation of setting a password has been performed, the controller 100 sets the password for the individual folder selected in step S144, based on the operation (step S300; Yes→step S302). For example, the controller 100 displays, on a display 140, a screen for inputting a password, and acquires the set password, based on a user operation. In a case where a set password has been acquired, the controller 100 stores the set password in individual folder information associated with the individual folder selected in step S144. Note that, in a case where an individual folder and a password are associated with each other, it is written that the password is set for the individual folder. Meanwhile, the controller 100 may receive an operation for setting a state that a password is not set in an individual folder (an operation of canceling a set password). In a case where an operation of canceling a password has been performed, the controller 100 deletes the password stored in individual folder information associated with the individual folder selected in step S144. Note that, in a case where it is determined that an operation of setting a password has not been performed in step S300, the controller 100 omits the processing of step S302 (step S300; No).

In addition, in step S154, in a case where it is determined that print data is not stored, the controller 100 determines whether a password is set for the individual folder selected in step S144 (step S154; No→step S304). In a case where a password has not been set, the controller 100 deletes the individual folder selected in step S144 (step S304; No→step S158). On the other hand, in a case where a password has been set, the controller 100 omits the processing of step S158 (step S304; Yes).

Figure 18:
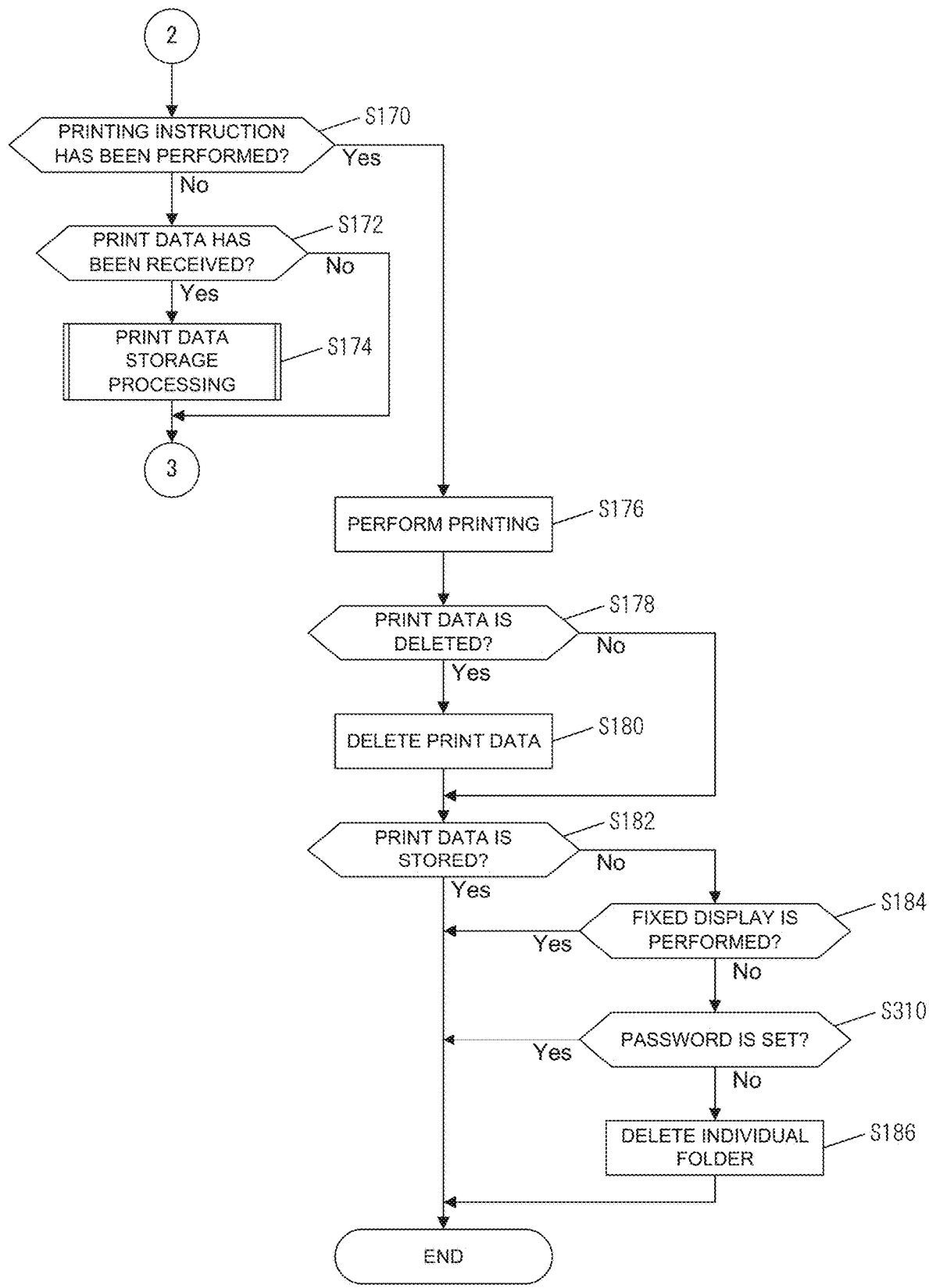
FIG. 18 is a flowchart of the individual folder display processing according to the third embodiment

Next, processing illustrated in FIG. 18 is described. In the present embodiment, in a case where when it is determined that the individual folder selected in step S144 is not fixedly displayed, the controller 100 determines whether a password is set for the individual folder (step S184; No→step S310). In a case where a password is not set, the controller 100 deletes the individual folder selected in step S144 (step S310; No→step S186). On the other hand, in a case where a password is set, the controller 100 omits the processing of step S186 (step S310; Yes).

As described above, even in a case where a password is set for an individual folder, and the individual folder is protected, the multifunction peripheral according to the present embodiment is enabled to display the individual folder without deleting the individual folder, regardless of whether or not print data is stored.

4. Fourth Embodiment

Next, a fourth embodiment is described. The fourth embodiment is an embodiment in which, in addition to the processing described in the first embodiment, the user is allowed to select moving an individual folder to a user folder, in a case where the user performs an operation of fixedly displaying the individual folder. In the present embodiment, FIG. 7 of the first embodiment is replaced with FIG. 19. Note that, the same processing is denoted by the same reference sign, and description is omitted.

4.1 Flow of Processing

Figure 19:
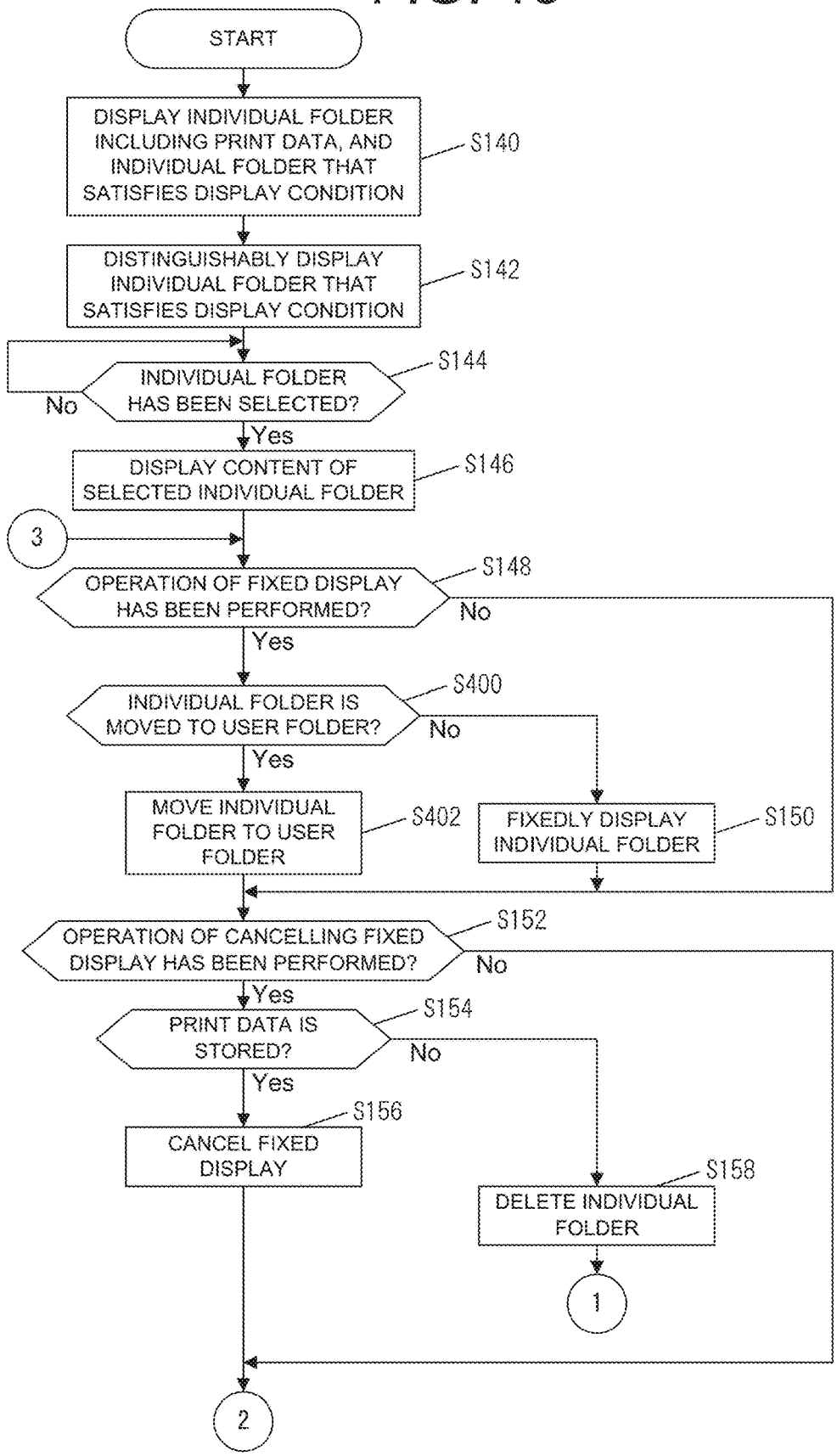
FIG. 19 is a flowchart of individual folder display processing according to a fourth embodiment.

A flow of individual folder display processing according to the present embodiment is described with reference to FIG. 19. In the present embodiment, in a case where an operation of fixedly displaying an individual folder has been performed, a controller 100 determines whether to move the individual folder to a user folder (step S148; Yes→step S400). For example, the controller 100 displays, on a display 140, a screen (confirmation dialog) that inquires whether to move an individual folder to a user folder, and determines whether to move the individual folder to the user folder in response to a response from the user.

In a case where an individual folder is moved to a user folder, the controller 100 moves the individual folder to the user folder of the user who operates a multifunction peripheral 10 (step S400; Yes→step S402). Note that, the controller 100 may set the user who operates the multifunction peripheral 10, as the user authenticated in step S108 in FIG. 5, or may inquire the user who operates the multifunction peripheral 10 before moving the individual folder to the user folder. Consequently, the individual folder selected in step S144 is moved from an individual folder storage area 1622 to a user folder, and is changed (upgraded) from a folder to be managed by the multifunction peripheral 10 to a folder to be managed by the user. On the other hand, in a case where an individual folder is not moved to a user folder, the controller 100 fixedly displays the individual folder (step S400; No→step S150).

4.2 Operation Example

Figure 20A:
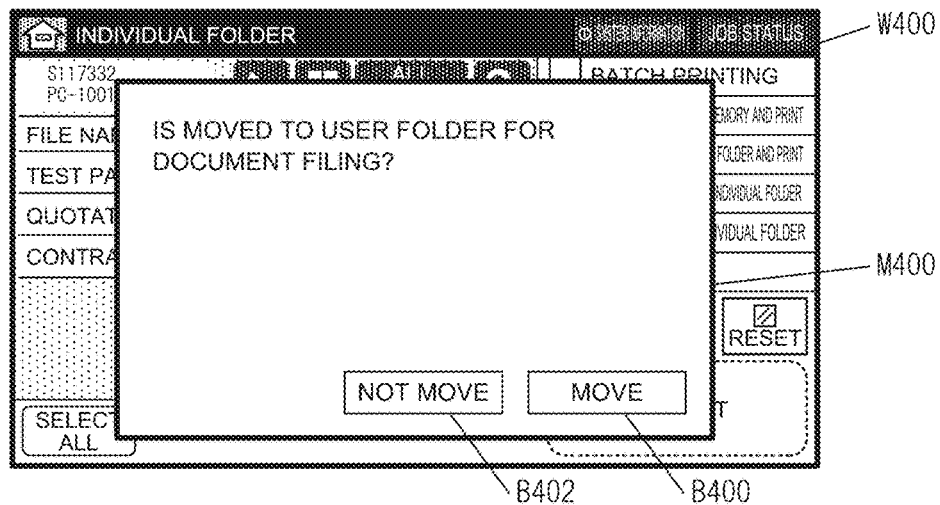
FIGS. 20A to 20C are diagrams illustrating an operation example according to the fourth embodiment.
Figure 20B:
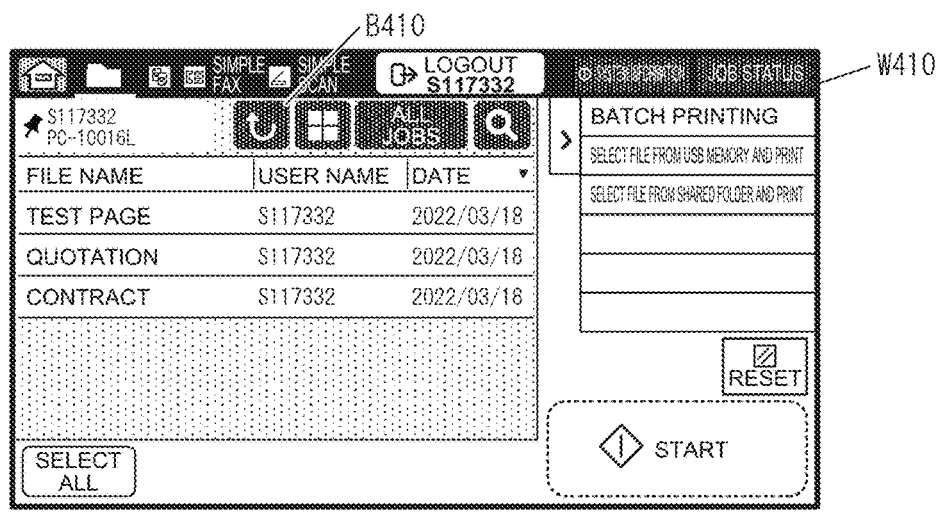
Figure 20C:
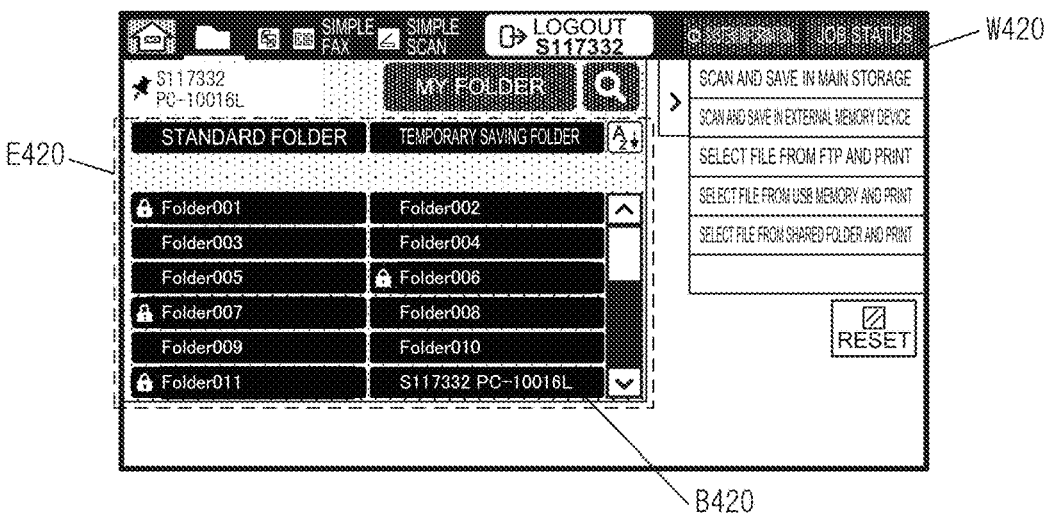

FIGS. 20A to 20C are diagrams illustrating screen examples of a screen to be displayed on a display 140. FIG. 20A is a diagram illustrating a screen example of a screen W400 to be displayed in a case where the user performs an operation of fixedly displaying an individual folder (a case where the button B112 in FIG. 9B is selected). A confirmation dialog M400 that inquires whether to move an individual folder to a user folder is displayed on the screen W400. The confirmation dialog M400 includes a button B400 that instructs to move an individual folder to a user folder, and a button B402 that instructs not to move the individual folder to the user folder.

When the button B400 is selected by the user, an individual folder selected by the user is moved to a user folder of the user. FIG. 20B is a diagram illustrating a screen example of a screen W410 on which a content of an individual folder moved to a user folder is displayed. Note that, when an individual folder is moved to a user folder, the individual folder is switched from a folder to be managed by the multifunction peripheral 10 to a folder (one of sub folders in a user folder) to be managed by the user. Thus, a folder switched from an individual folder to a sub folder in a user folder is continued to be present in the user folder, even in a case where all pieces of data such as a file are deleted from the folder.

The screen W410 includes a button B410 for moving a folder to an upper folder. FIG. 20C is a diagram illustrating a screen example of a screen W420 to be displayed in a case where the button B410 is selected. The screen W420 includes an area E420 where a folder in a user folder, a file, or print data in a user folder are displayed. As illustrated in the area E420 in FIG. 20C, an individual folder moved to a user folder is displayed together with another folder in the user folder. In the example of FIG. 20C, "S117332 PC-10016L", which is an individual folder displayed in FIG. 20B, is displayed as one folder in a user folder, as indicated by a button B420 included in the area E420. Note that, the user can display the content "S117332 PC-10016L", which is a folder in a user folder by selecting the button B420.

Note that, in a case where the user selects the button B402 displayed on the screen W400 illustrated in FIG. 20A, merely fixed display of an individual folder is performed. In this case, the screen W120 illustrated in FIG. 10A is displayed.

As described above, the multifunction peripheral according to the present embodiment is enabled to switch an individual folder to a folder to be managed by the user. Consequently, the user can switch an individual folder to a folder to be managed by the user himself/herself, and perform a flexible operation such as setting the folder as a backup target.

5. Fifth Embodiment

Next, a fifth embodiment is described. The fifth embodiment is an embodiment, in addition to the processing described in the first embodiment, an individual folder that satisfies a display condition, and an individual folder that does not satisfy the display condition are displayed separately. In the present embodiment, FIG. 7 of the first embodiment is replaced with FIG. 21. Note that, the same processing is denoted by the same reference sign, and description thereof is omitted.

5.1 Flow of Processing

Figure 21:
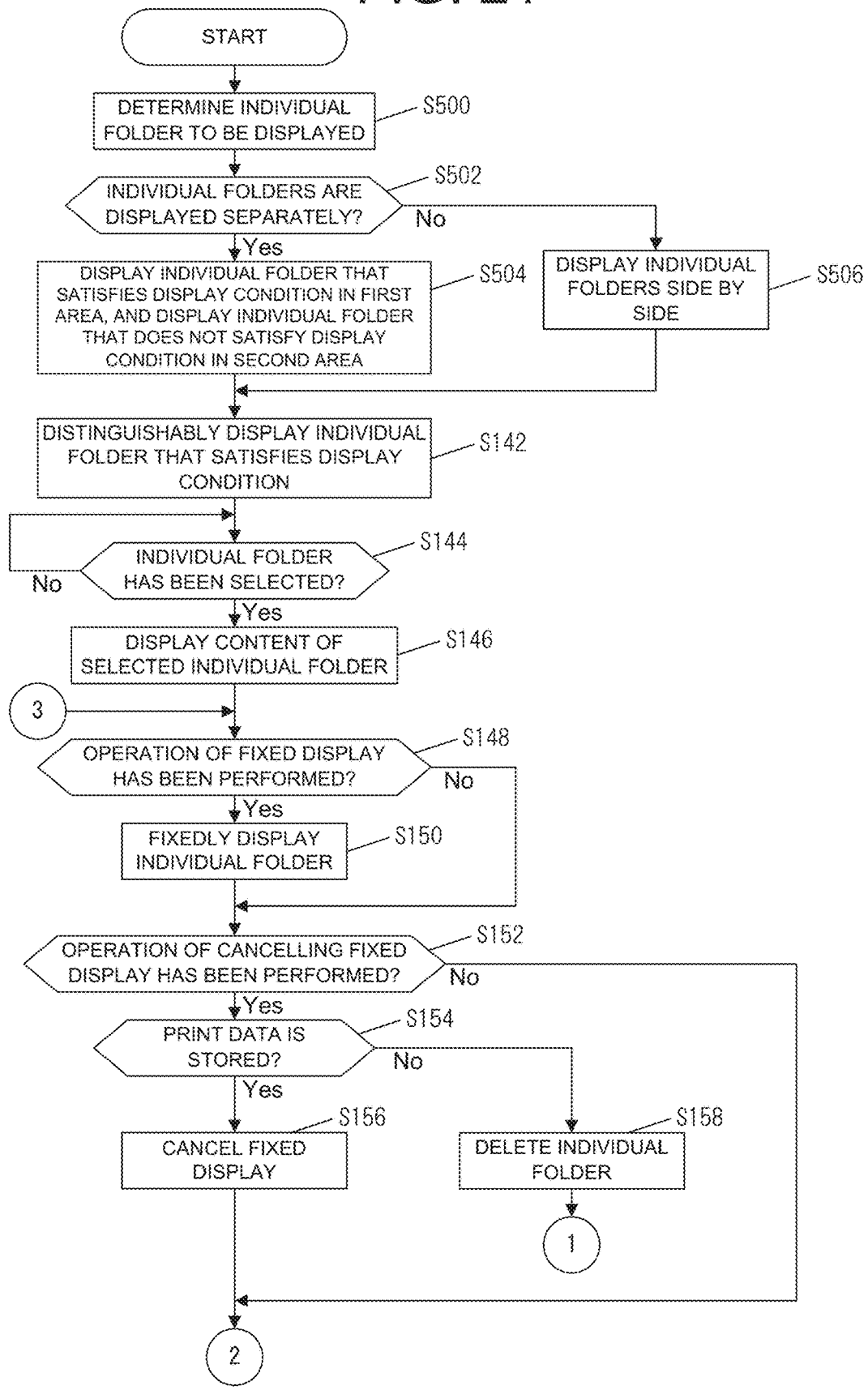
FIG. 21 is a flowchart of individual folder display processing according to a fifth embodiment.

A flow of individual folder display processing according to the present embodiment is described with reference to FIG. 21. In the present embodiment, a controller 100 determines an individual folder to be displayed (step S500). The individual folder to be displayed is an individual folder that stores print data, and an individual folder that satisfies a display condition.

Subsequently, the controller 100 determines whether to display individual folders separately (step S502). For example, the controller 100 displays a toggle switch or the like that make settings as to whether to display individual folders separately on an individual folder list screen, and determines whether to display the individual folders separately according to a state of the toggle switch. Note that, settings as to whether to display individual folders separately may be stored in a setting table 170. In this case, the controller 100 refers to the setting table 170, and determines whether to separately display individual folders.

In a case where individual folders are separately displayed, the controller 100 displays, from among the individual folders determined in step S500, an individual folder that satisfies a display condition in a first area, and displays an individual folder that does not satisfy the display condition in a second area (step S502; Yes→step S504). The first area and the second area are areas that are set on an individual folder list screen, and that do not overlap each other. For example, the controller 100 divides an individual folder list screen into an upper area and a lower area, sets the upper area on the screen, as the first area, and sets the lower area on the screen, as the second area. Further, the controller 100 arranges buttons indicating names of individual folders in the set first area and second area. In this way, display areas for an individual folder that satisfies the display condition, and for an individual folder that does not satisfy the display condition are separated.

On the other hand, in a case where individual folders are not separately displayed, the controller 100 displays the individual folders determined in step S500 side by side, regardless of whether or not the display condition is satisfied (step S502; No→step S506).

5.2 Operation Example

Figure 22A:
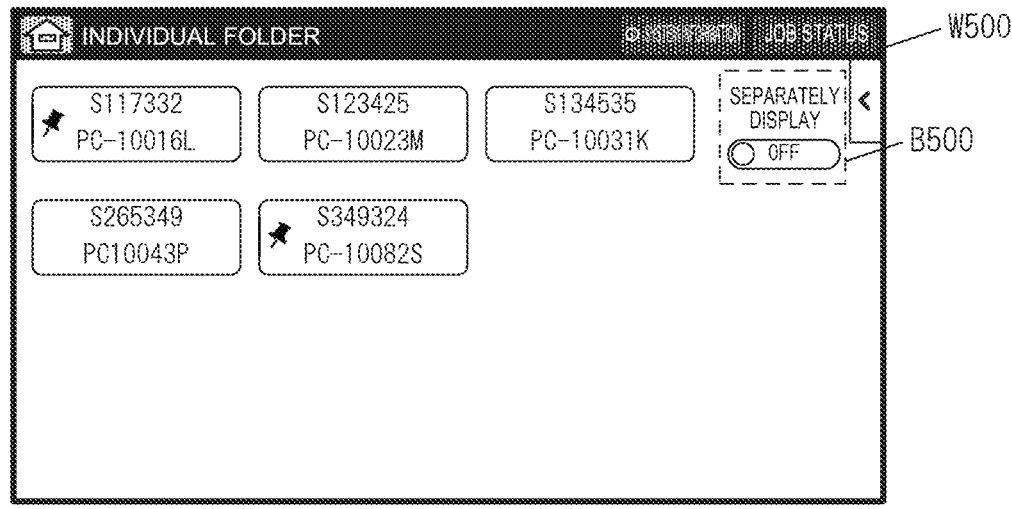
FIGS. 22A and 22B are diagrams illustrating an operation example according to the fifth embodiment.
Figure 22B:
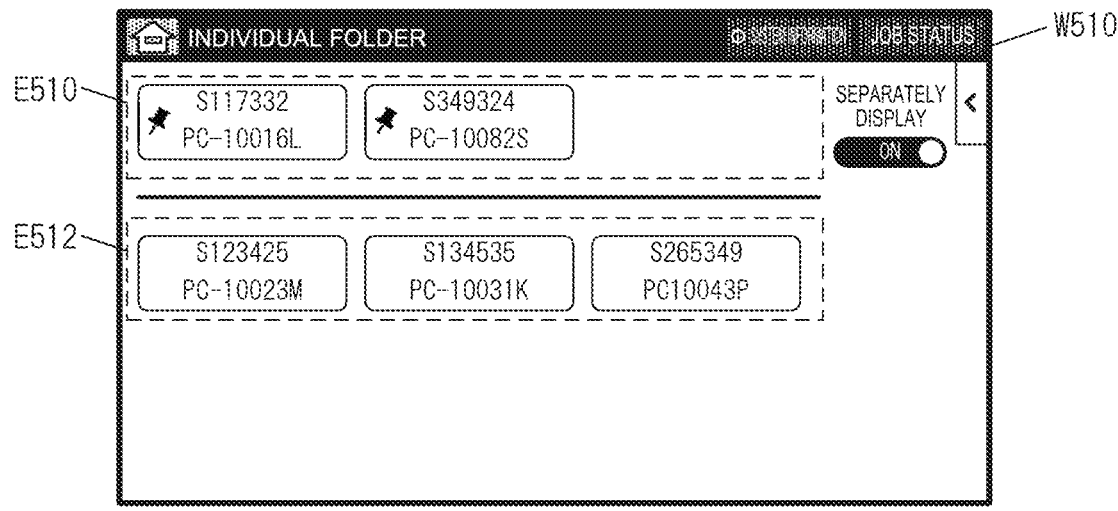

Diagrams illustrated in FIGS. 22A and 22B are diagrams illustrating screen examples of a screen to be displayed on a display 140. FIG. 22A is a diagram illustrating a screen example of an individual folder list screen W500. The individual folder list screen includes a toggle switch B500 that makes settings as to whether to separately display individual folders. Settings are made in such a way as not to separately display individual folders on the individual folder list screen W500. In this case, individual folders are displayed side by side, regardless of whether or not the display condition is satisfied.

FIG. 22B is a diagram illustrating a screen example of an individual folder list screen W510, and is a screen on which settings are made in such a way as to separately display individual folders. In this case, an individual folder that satisfies the display condition is displayed in a first area E510, and an individual folder that does not satisfy the display condition is displayed in a second area E512. Note that, in a case where settings are made in such a way as not to separately display individual folders on the individual folder list screen W510, the individual folder list screen W500 is displayed instead of the individual folder list screen W510.

As described above, the multifunction peripheral according to the present embodiment is enabled to separately display an individual folder that satisfies a display condition, and an individual folder that does not satisfy the display condition. Thus, the multifunction peripheral according to the present embodiment allows the user to easily search for an individual folder that satisfies a display condition.

6. Sixth Embodiment

Next, a sixth embodiment is described. The sixth embodiment is an embodiment, in addition to the processing described in the first embodiment, whether unprinted print data (unprinted data) are included in a specific folder is displayed in a distinguishable manner. In the present embodiment, FIG. 2 of the first embodiment is replaced with FIG. 23, and FIG. 7 of the first embodiment is replaced with FIG. 25. Note that the same functional unit and the same processing are denoted by the same reference sign, and description thereof is omitted.

6.1 Functional Configuration

Figure 23:
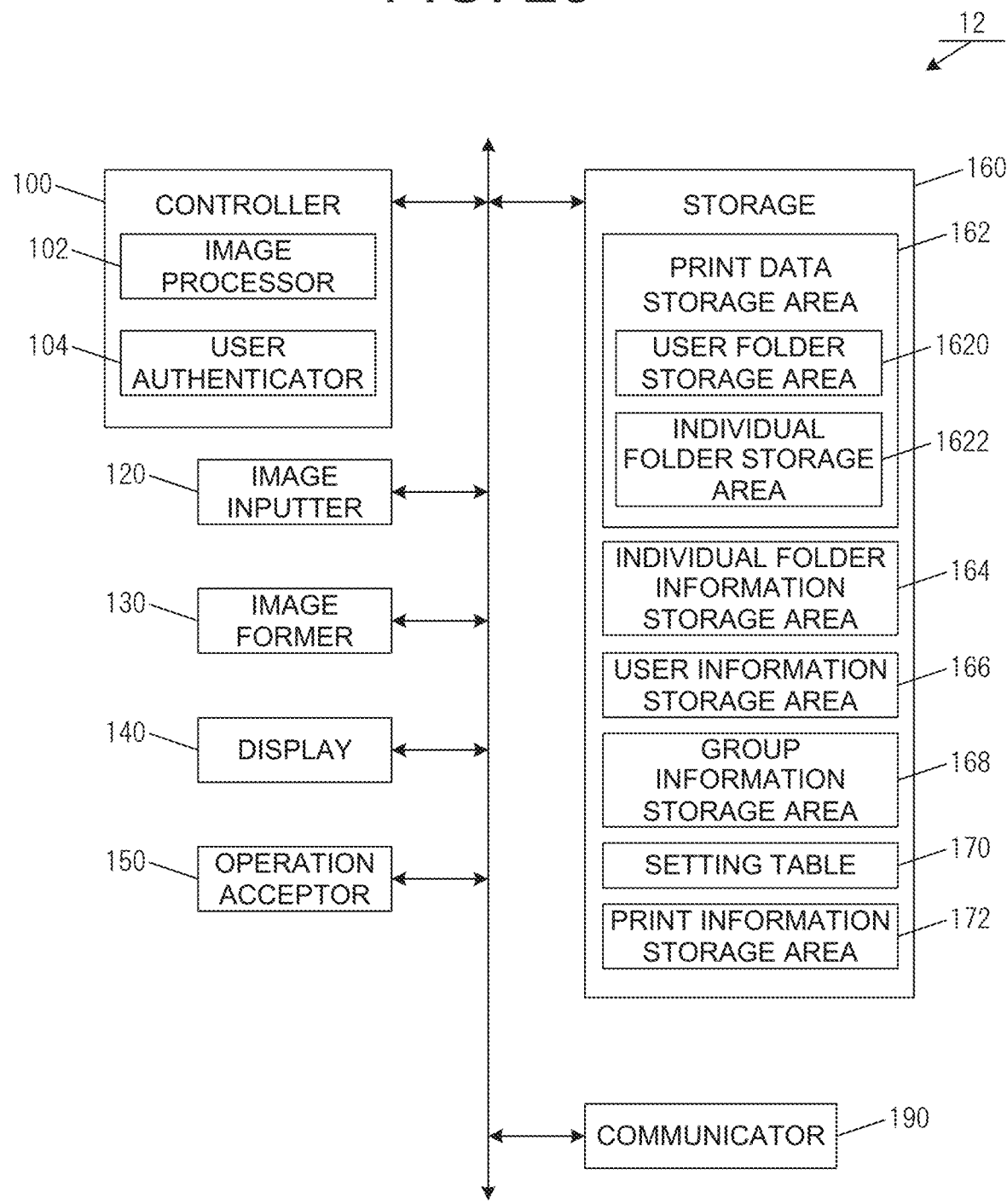
FIG. 23 is a diagram illustrating a functional configuration of a multifunction peripheral according to a sixth embodiment.

FIG. 23 is a diagram illustrating a functional configuration of a multifunction peripheral 12 according to the present embodiment. The multifunction peripheral 12 is different from the multifunction peripheral 10 according to the first embodiment in a point that a print information storage area 172 is further secured in a storage 160.

The print information storage area 172 stores information (print information) in which print data stored in a specific folder, and a date and time when an image based on the print data is formed (printed) are associated with each other. For example, as illustrated in FIG. 24, the print information includes an individual folder name (e.g., "S117332 PC-10016L"), a print data name (e.g., "test page"), and a last print date and time (e.g., "2022/03/19 11:20:49") indicating the date and time when print data to be determined by the print data name have been printed last time. In other words, print data, and a last print date and time are associated with each other by print information.

6.2 Flow of Processing

6.2.1 Print Data Storage Processing

A controller 100 performs the processing illustrated in FIG. 6, as print data storage processing. At this occasion, in a case where print data is stored in an individual folder in step S126, the controller 100 stores, in the print information storage area 172, print information including a name of the individual folder and a name of the print data, and in which the last print date and time is empty.

6.2.2 Individual Folder Display Processing

Figure 25:
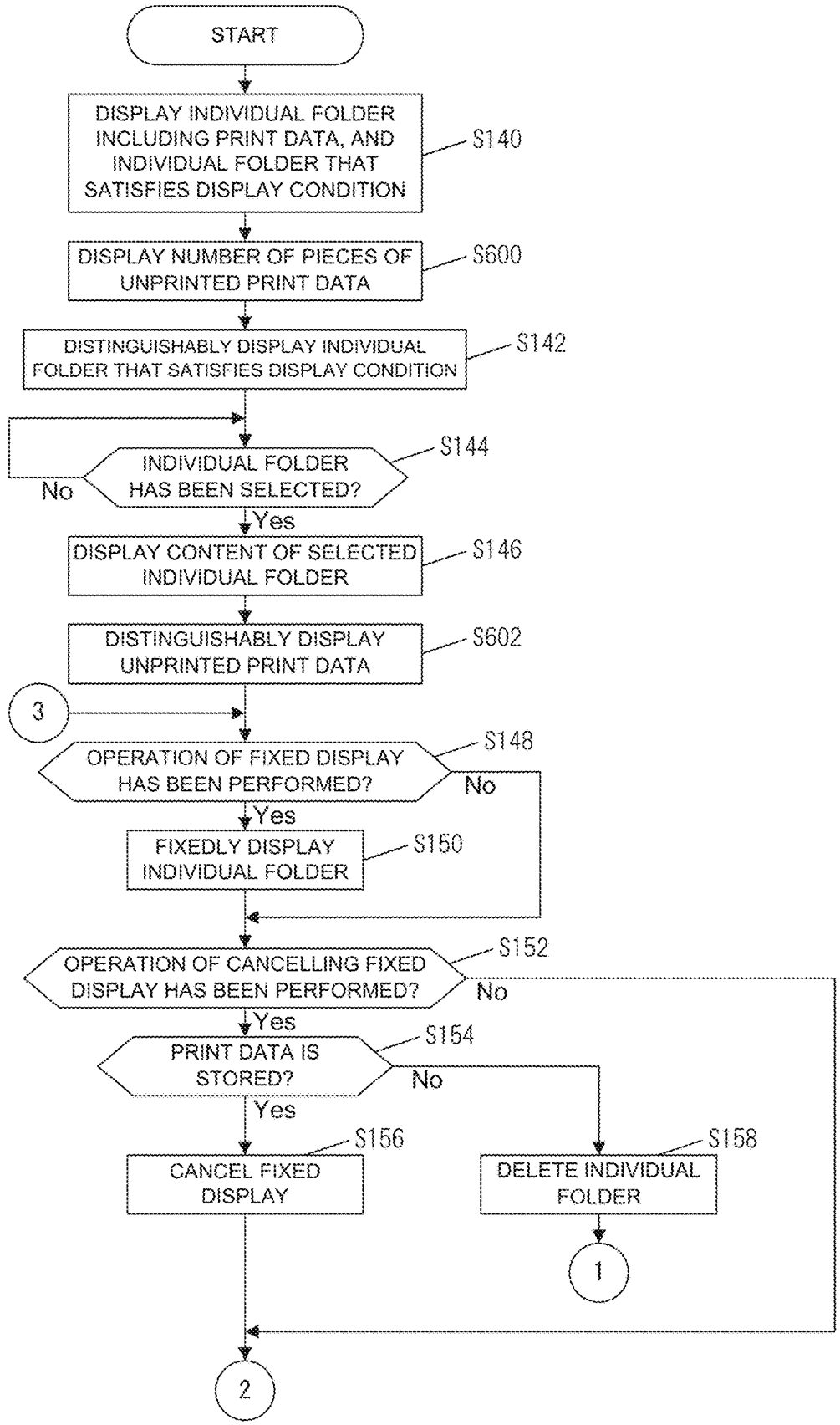
FIG. 25 is a flowchart of individual folder display processing according to the sixth embodiment.

A flow of individual folder display processing according to the present embodiment is described with reference to FIG. 25. In the present embodiment, after the processing of step S140 is performed, the number of pieces of unprinted print data among print data stored in the individual folder is displayed for each individual folder that satisfies a display condition (step S600).

For example, the controller 100 subtracts the number of pieces of print data (printed print data) associated with the last print date and time in print information from the number of pieces of print data stored in the individual folder, for each individual folder that satisfies the display condition. Thus, the controller 100 can acquire the number of pieces of unprinted print data. Further, the controller 100 displays the number of pieces of unprinted print data in the individual folder around the name of the individual folder that satisfies the display condition. Note that, the controller 100 may omit displaying the number of pieces of unprinted print data regarding an individual folder in which the number of pieces of unprinted print data is 0.

Further, after displaying a content of the individual folder selected by the user, the controller 100 displays the unprinted print data in a distinguishable manner (step S602).

For example, the controller 100 may attach a mark or an icon near the name of unprinted print data. Note that, the controller 100 may display the last print date and time together with the name of print data. In this case, regarding unprinted print data, the unprinted print data may be displayed in a distinguishable manner by displaying the last print date and time, as "---".

Note that, in a case where print data selected by the user are printed, the controller 100 stores the date and time when printing has been performed in the last print date and time of print information associated with the print data. Further, in a case where print data is deleted, the controller 100 deletes print information associated with the print data from the print information storage area 172.

6.3 Operation Example

Figure 26A:
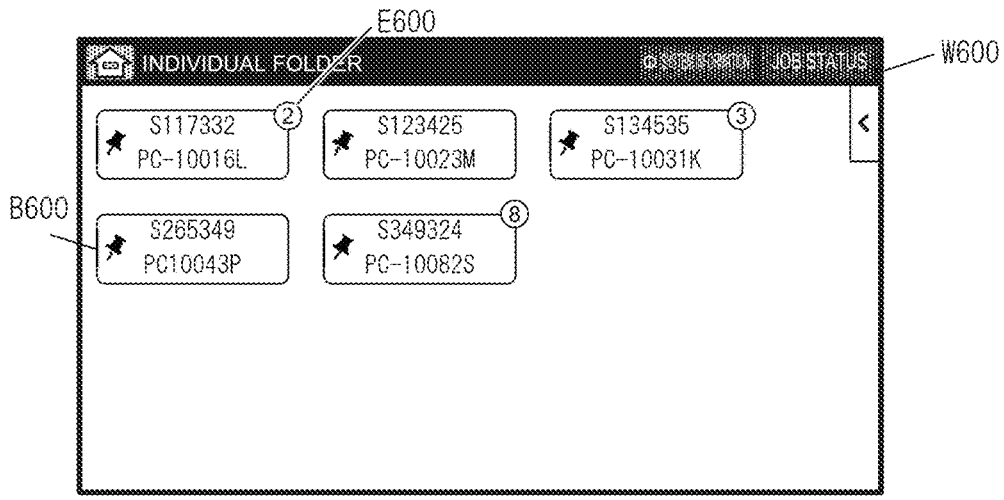
FIGS. 26A to 26C are diagrams illustrating an operation example according to the sixth embodiment.
Figure 26B:
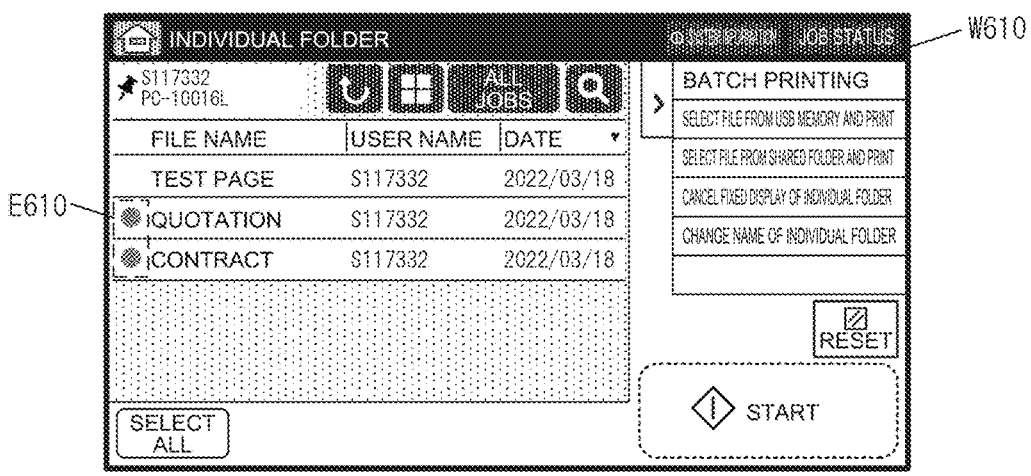
Figure 26C:
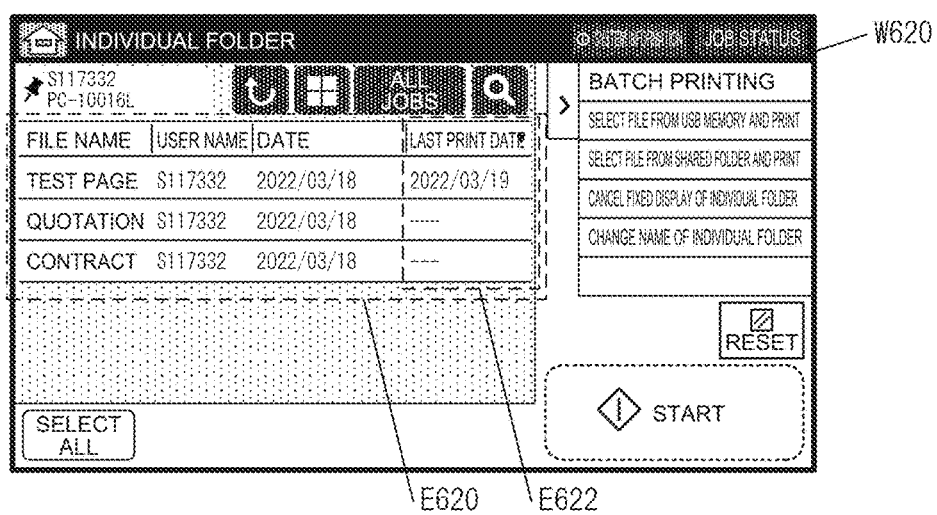

FIGS. 26A to 26C are diagrams illustrating screen examples of a screen to be displayed on the display 140. FIG. 26A is a diagram illustrating a screen example of an individual folder list screen W600. As illustrated in E600 in FIG. 26A, the number (e.g., "2") of pieces of print data stored in an individual folder, and being the number of pieces of unprinted print data is displayed on an upper right of a button of the individual folder that satisfies the display condition. Note that, even when the individual folder satisfies the display condition, in a case where the number of pieces of unprinted print data is 0, the number of pieces of unprinted print data is not displayed (e.g., a button B600 in FIG. 26A). Thus, the user is allowed to easily recognize whether unprinted print data is included.

FIG. 26B is a diagram illustrating a screen example of a screen W610 that displays a content of a selected individual folder. As illustrated in FIG. 26B, an icon E610 for unprinted print data may be displayed next to the name of print data. Further, FIG. 26C is a diagram illustrating a screen example of a screen W620, which is a screen that displays a content of a selected individual folder, and is different from the screen W610. The screen W620 includes an area E620 where names of individual folders are displayed as a list, and the area E620 includes an area E622 where a last print date is displayed. The last print date is information acquired by removing time information from the last print date and time. Also, a title portion of the list may be sortable by selection. Since a last print date is sorted, each of print data in which a last print date is present, and print data in which a last print date is not present is collectively displayed.

As described above, the multifunction peripheral according to the present embodiment is enabled to display the number of pieces of unprinted print data, and is enabled to display unprinted print data in a distinguishable manner. This prevents the user from failing to know whether unprinted print data is present, in a case where an individual folder is fixedly displayed, and the individual folder is constantly displayed. Further, since information on the last print date and time is displayed together with information indicating whether or not print data is unprinted, the user can easily recognize a printing status, in a case where print data is periodically printed. In addition, since the multifunction peripheral according to the present embodiment displays unprinted print data in a distinguishable manner, the user can avoid a mistake that an image based on the same print data as print data that have already been printed may be erroneously printed.

7. Seventh Embodiment

Next, a seventh embodiment is described. The seventh embodiment is an embodiment in which, in addition to the processing described in the first embodiment, individual folders are automatically grouped and displayed. In the present embodiment, FIG. 7 of the first embodiment is replaced with FIG. 27. Note that, the same processing is denoted by the same reference sign, and description thereof is omitted.

7.1 Flow of Processing

Figure 27:
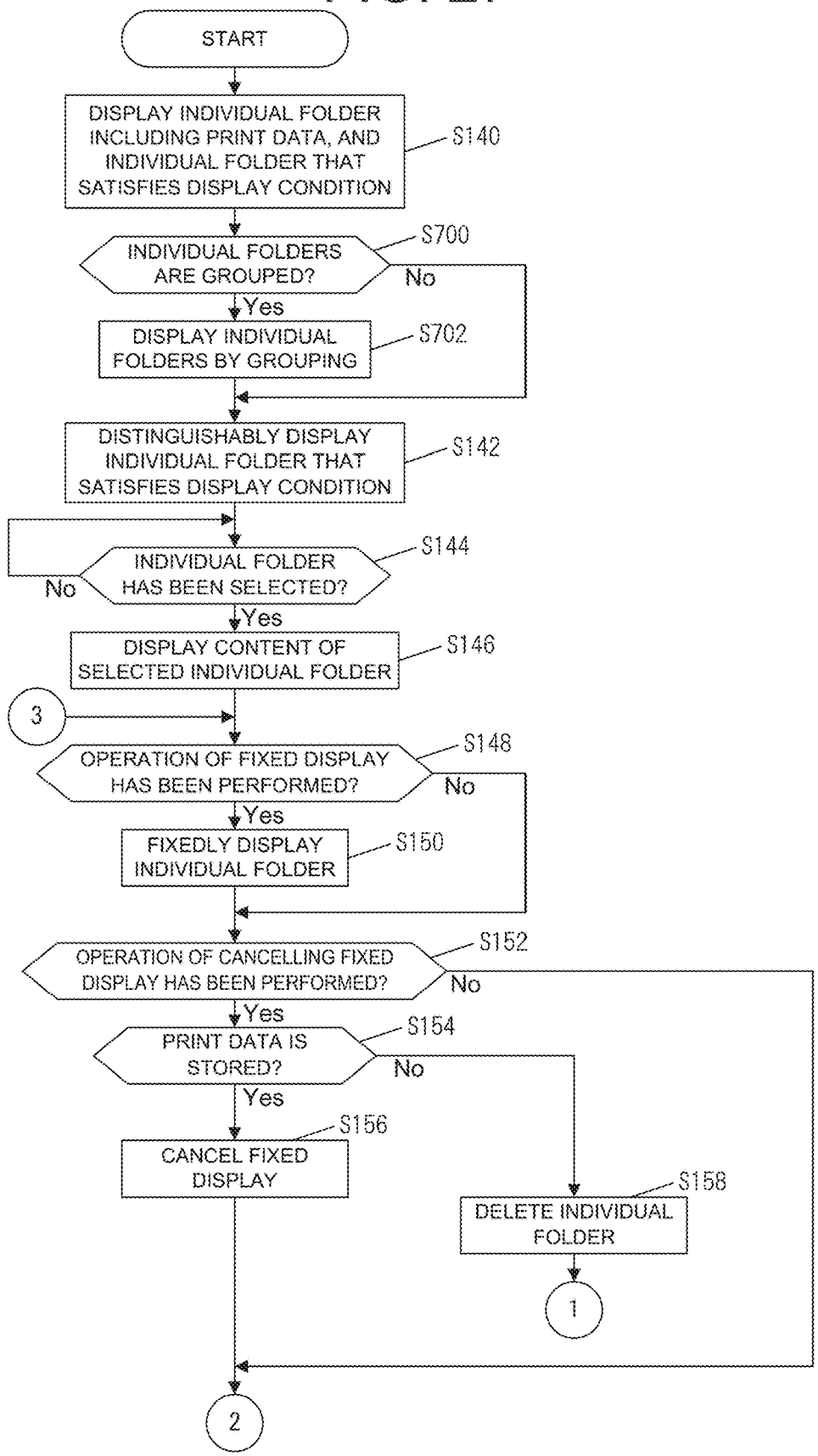
FIG. 27 is a flowchart of individual folder display processing according to a seventh embodiment.

A flow of individual folder display processing according to the present embodiment is described with reference to FIG. 27. In the present embodiment, after the processing in step S140, a controller 100 determines whether to group individual folders (step S700). For example, the controller 100 displays a toggle switch or the like for setting whether to group individual folders on an individual folder list screen, and determines whether to group the individual folders according to a state of the toggle switch. Note that, settings as to whether to group individual folders on an individual folder list screen may be stored in a setting table 170.

In a case where individual folders are grouped, the controller 100 groups and displays the individual folders (step S700; Yes→step S702). For example, the controller 100 groups a plurality of individual folders having a common user name or computer name, and displays a name indicating a group of the plurality of individual folders. At this occasion, the controller 100 may display grouped individual folders, and ungrouped individual folders in a different mode. In addition, information (e.g., a user name or a computer name) serving as a criterion for grouping may be specified in advance, or may be specifiable on an individual folder list screen.

Note that, in a case where a grouped individual folder is selected, the controller 100 displays the name of an individual folder included in the selected group in a selectable manner. In addition, in step S142, in a case where an individual folder that satisfies a display condition is included in a plurality of individual folders included in a group, the controller 100 displays the group in a distinguishable manner. Note that, in a case where individual folders are not grouped, the controller 100 omits step S702 (step S700; No).

7.2 Operation Example

Figure 28A:
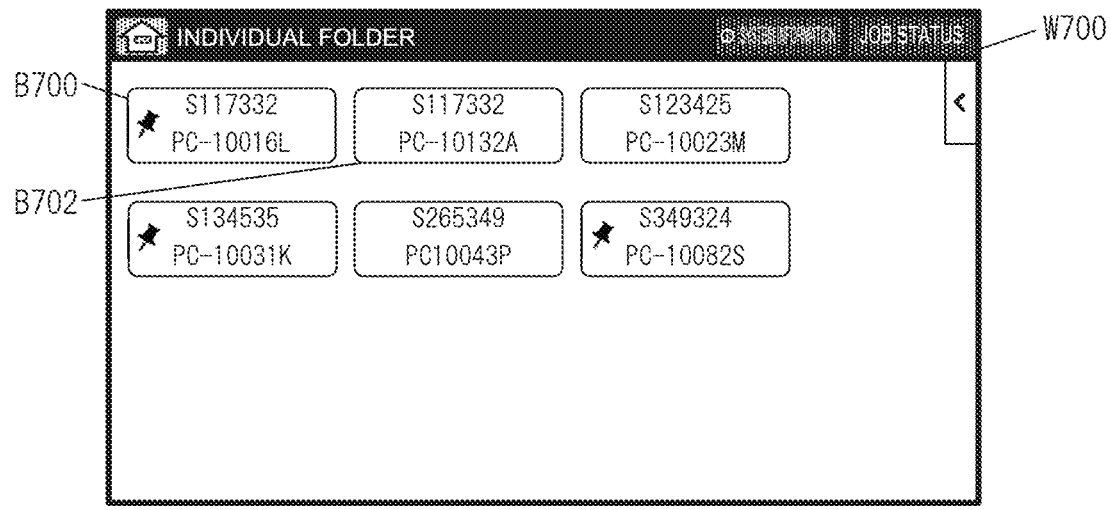
FIGS. 28A and 28B are diagrams illustrating an operation example according to the seventh embodiment.
Figure 28B:
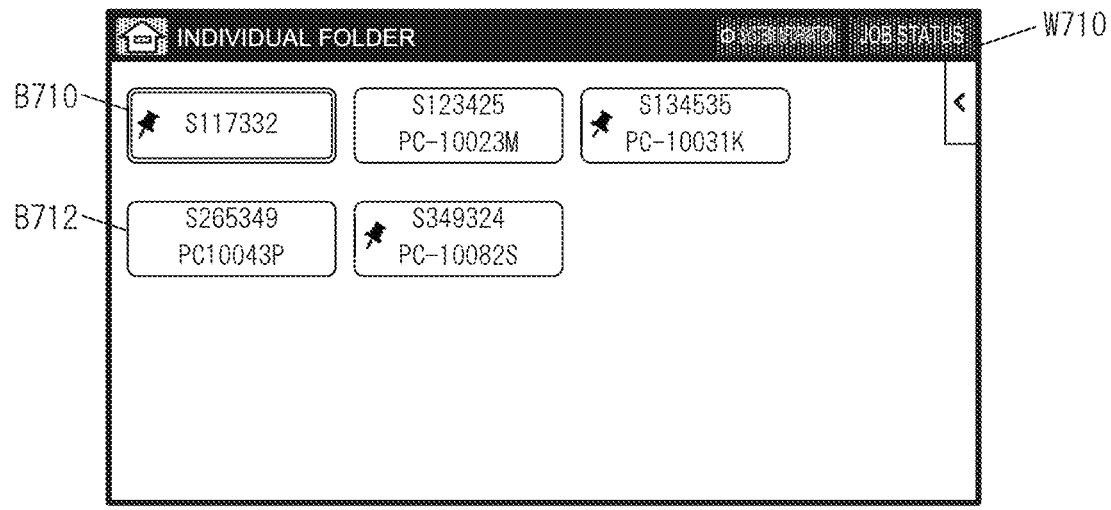

Diagrams illustrated in FIGS. 28A and 28B are diagrams illustrating screen examples of a screen to be displayed on a display 140. FIG. 28A is a diagram illustrating a screen example of an individual folder list screen W700. The individual folder list screen W700 includes a button on which a name of an individual folder is displayed. Herein, an individual folder associated with a button B700, and an individual folder associated with a button B702 include, in a name, the user name "S117332". For example, a case that the user whose user name is "S117332" gives a print instruction on a different computer, a plurality of individual folders including "S117332" in the name are generated. In this case, the individual folder associated with the button B700, and the individual folder associated with the button B702 belong to the same group, in a case where the individual folders are grouped based on the user name.

FIG. 28B is a diagram illustrating a screen example of an individual folder list screen W710 in a case where the individual folders illustrated in FIG. 28A are grouped. The individual folder list screen W710 includes a button B710 on which a name indicating a group of individual folders is displayed. The button B710 is a button indicating a group of individual folders having a common user name. The button B710 is displayed in such a way that the common user name "S117332" is the name of the group. In other words, a computer name is not displayed, and only the user name is displayed. In addition, unlike a button (e.g., a button B712 in FIG. 28B) of an individual folder that is not grouped, the button B710 displays the edge of the button with a double line. Thus, the user can recognize that the button B710 indicates a group of individual folders. Note that, in a case where the button B710 is selected by the user, an individual folder belonging to the group associated with the button B710 is displayed in a selectable manner.

Note that, in a case where settings are made in such a way as to group an individual folder, grouping may not be constantly performed, but grouping individual folders may be switched according to a situation. For example, a multifunction peripheral 10 may set in advance an upper limit number (e.g., 20) of individual folders to be displayed on an individual folder list screen, and grouping may be performed in a case where the number of individual folders exceeds the upper limit number.

As described above, the multifunction peripheral according to the present embodiment is enabled to group individual folders having common information on a user who has transmitted print data, or individual folders having common information on an apparatus that has transmitted print data. Thus, even in a case where the number of individual folders increases, the multifunction peripheral according to the present embodiment is enabled to avoid a state in which it is difficult to find an individual folder.

8. Eighth Embodiment

Next, an eighth embodiment is described. The eighth embodiment is an embodiment in which, in addition to the processing described in the first embodiment, individual folders browsable by an authenticated user are restricted, in a case where user authentication is performed. In the present embodiment, FIG. 3A of the first embodiment is replaced with FIG. 29A, FIG. 3B of the first embodiment is replaced with FIG. 29B, FIG. 5 of the first embodiment is replaced with FIG. 30, and FIG. 7 of the first embodiment is replaced with FIG. 31. Note that, the same processing is denoted by the same reference sign, and description thereof is omitted.

8.1 Functional Configuration

FIG. 29A is a diagram illustrating an example of a data configuration of individual folder information according to the present embodiment. An individual folder according to the present embodiment further includes a disclosure destination 1, a disclosure destination 2, and a disclosure destination 3, in addition to the individual folder information according to the first embodiment. The disclosure destination indicates a group to which a user who can browse the individual folder belongs. Information (e.g., a group name) that determines a group is stored in the disclosure destination.

FIG. 29B is a diagram illustrating an example of a data configuration of user information according to the present embodiment. The user information according to the present embodiment includes a display pattern (e.g., "S117332*"), in addition to the user information according to the first embodiment. The display pattern is information that determines the name of an individual folder browsable by the user. The display pattern may be specified by using a wild card, or may be specified by dividing the names of all the browsable individual folders by commas.

8.2 Flow of Processing

8.2.1 Main Processing

Figure 30:
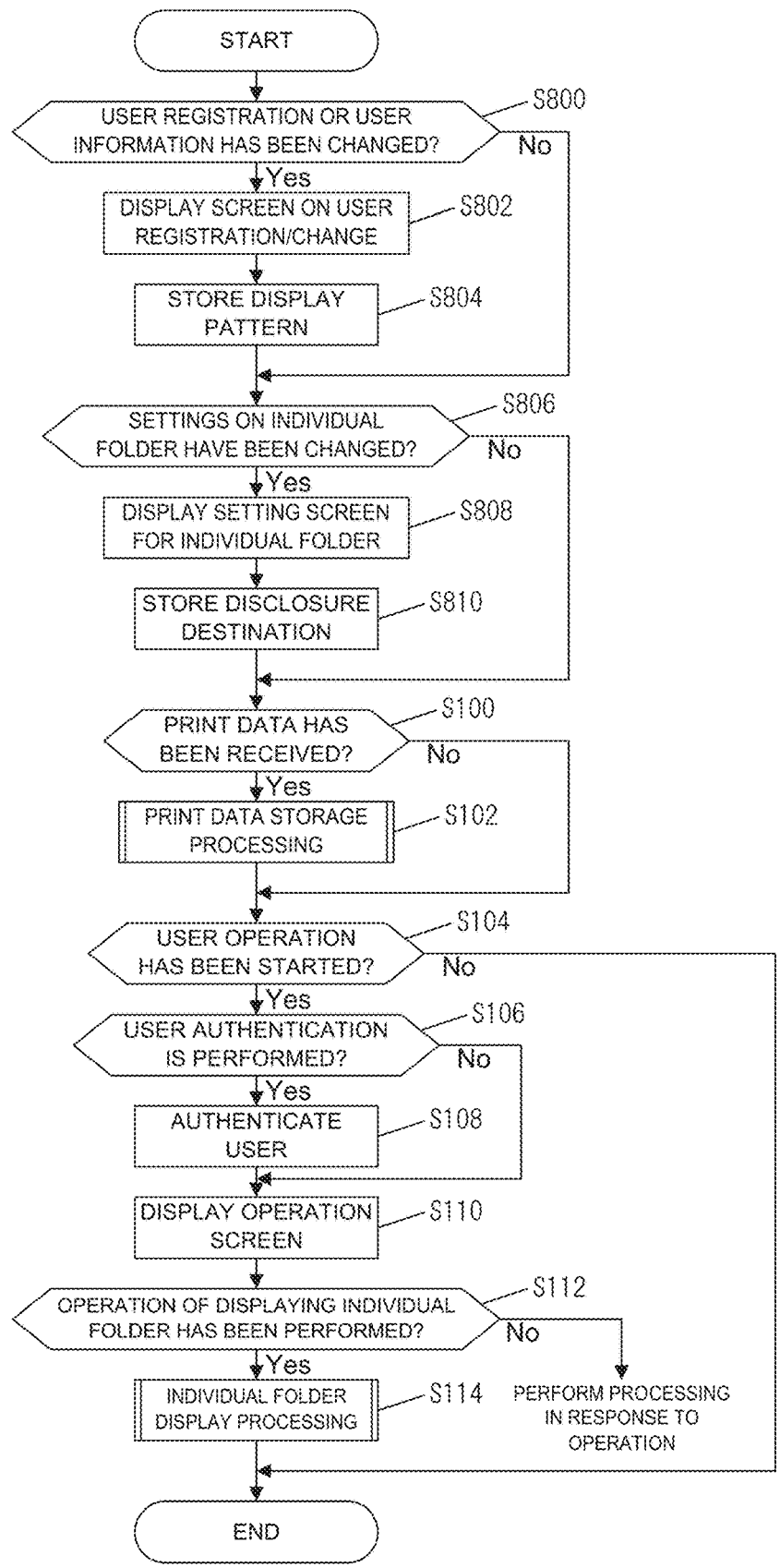
FIG. 30 is a flowchart of main processing according to the eighth embodiment.

A flow of main processing according to the present embodiment is described with reference to FIG. 30. In the present embodiment, in a case where an operation of user registration or changing user information has been performed, a controller 100 displays a screen on which user registration or changing user information is performed (step S800; Yes→step S802). For example, in a case where the controller 100 detects that an operation of user registration or changing user information has been performed from another apparatus via a communicator 190, the controller 100 displays, to the another apparatus, information on a screen on which user registration or changing user information is performed.

Subsequently, in a case where an operation of performing user registration or an operation of changing user information has been performed via the screen displayed in step S802, the controller 100 stores the user information, based on information input to the screen. At this occasion, the controller 100 stores the display pattern input by the user in user information of the user to be registered, or in user information to be changed (step S804).

Note that, in a case where it is determined that an operation of user registration or changing the user information has not been performed in step S800, the controller 100 omits the pieces of processing of step S802 and step S804 (step S800; No).

Subsequently, in a case where an operation of changing settings on an individual folder has been performed, the controller 100 displays an individual folder setting screen (step S806; Yes→step S808). For example, in a case where the controller 100 detects that an operation of changing settings on an individual folder has been performed from another apparatus via the communicator 190, the controller 100 transmits information on an individual folder setting screen to the another apparatus.

Subsequently, in a case where an operation of changing settings on an individual folder has been performed via the individual folder setting screen, the controller 100 stores individual folder information, based on information input to the setting screen. At this occasion, the controller 100 stores a disclosure destination input by the user in the individual folder information associated with the individual folder to be set (step S810).

Note that, in a case where it is determined that an operation of changing settings on an individual folder has not been performed in Step S806, the controller 100 omits the piece of processing of step S808 and step S810 (step S806; No).

8.2.2 Individual Folder Display Processing

Figure 31:
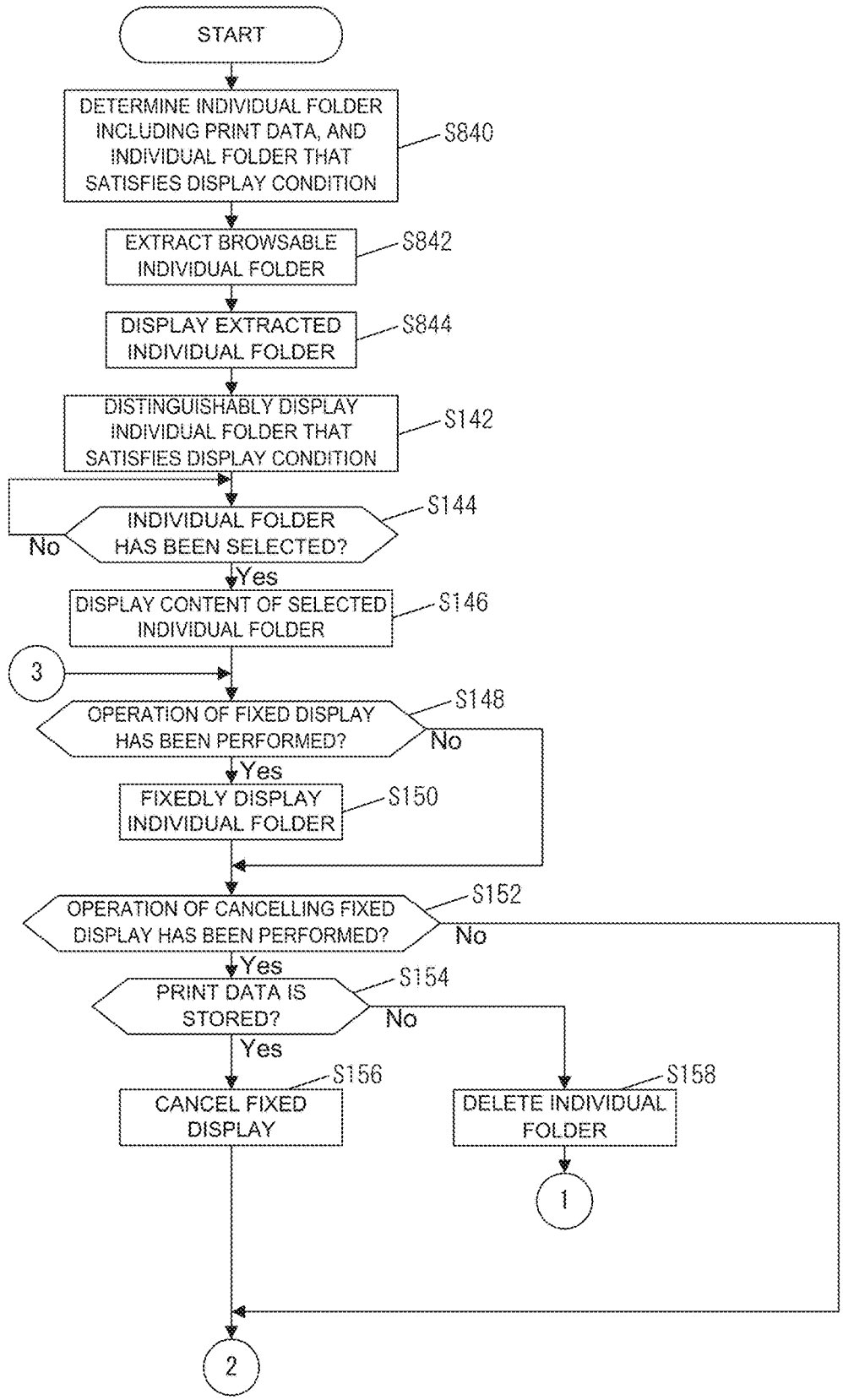
FIG. 31 is a flowchart of individual folder display processing according to the eighth embodiment.

A flow of individual folder display processing according to the present embodiment is described with reference to FIG. 31. In the present embodiment, the controller 100 determines an individual folder that includes print data, and an individual folder that satisfies a display condition (step S840), and extracts, from the determined folder, an individual folder browsable by the user who uses a multifunction peripheral 10 (step S842). Note that, the controller 100 may set the user who operates the multifunction peripheral 10, as the user authenticated in step S108 in FIG. 30, or may authenticate the user before performing the processing of step S842. Note that, in a case where the user who operates the multifunction peripheral 10 cannot be authenticated, the controller 100 may stop the processing of displaying an individual folder.

In step S842, the controller 100 performs the following two pieces of processing.
- (a) The controller 100 reads a display pattern stored in user information of the authenticated user. The controller 100 extracts, from the individual folder determined in step S840, an individual folder to which a name matching the content determined by the display pattern is assigned.
- (b) The controller 100 reads a belonging group stored in user information of the authenticated user. The controller 100 extracts, from the individual folder determined in step S840, an individual folder in which a group to which the user belongs is set as a disclosure destination. Subsequently, the controller 100 displays a screen that displays the individual folder extracted in step S844, as an individual folder list screen (step S844).

8.3 Operation Example

FIGS. 32A to 33B are diagrams illustrating screen examples of a screen to be displayed on a display 140. FIG. 32A is a screen example of a screen W800 on which user registration is performed. The screen W800 includes an item E800 that specifies a display pattern for specifying an individual folder browsable by the user for user registration. The user is allowed to perform user registration after inputting a display pattern (e.g., "S117332*") in an input field T800. The information input to the input field T800 is stored as a display pattern of user information.

FIG. 32B is a diagram illustrating a screen example of an individual folder list screen W810 on which only an individual folder having the name that matches the display pattern "S117332*" illustrated in FIG. 32A is displayed. As illustrated in FIG. 32B, only an individual folder having the name starting with "S117332" is displayed on the individual folder list screen W810.

FIG. 33A is a diagram illustrating a screen example of an individual folder setting screen W820. The setting screen W820 includes an area E820 where a group to which an individual folder is disclosed is specified. The example in FIG. 33A indicates that an individual folder having the name "S123425 PC-10023M" is disclosed to a user belonging to "Group 1".

FIG. 33B is a screen example of a screen W830 on which user registration is performed. The screen W830 includes an area E830 on which a group to which the user belongs is specified. The example of FIG. 33B indicates that the user having the user name "S117332" belongs to "Group 1".

Herein, in a case where an individual folder having the name "S123425 PC-10023M" is set to be disclosed to a user belonging to "Group 1", the user having the name "S117332" is allowed to browse the individual folder having the name "S123425 PC-10023M".

As described above, the multifunction peripheral according to the present embodiment associates a user with an individual folder, when the user is registered or user information is changed, and after the user logs in, the multifunction peripheral displays only an individual folder browsable by the user, thereby allowing the user to browse the individual folder. For example, only an individual folder of the user can be made browsable. Herein, since a computer name, a user name, or a login name is attached to an individual folder, the user name or the computer name of the user who uses the multifunction peripheral 10 may be known by a third party. Regarding a problem as described above, since the multifunction peripheral according to the present embodiment displays only an individual folder browsable by the user, it is possible to hide the user name of another user, or the computer name of an apparatus to be used by the another user, thereby enhancing security.

Further, the multifunction peripheral according to the present embodiment is enabled to specify a disclosure destination of an individual folder. Thus, allowing a user as a disclosure destination to freely browse an individual folder enables to achieve sharing of print data, and improve convenience of the user.

9. Ninth Embodiment

Next, a ninth embodiment is described. The ninth embodiment is an embodiment in which, in addition to the processing described in the first embodiment, in a case where an external apparatus that transmits data to a multifunction peripheral is a mobile phone such as a smartphone, an individual folder to which a name based on information on the mobile phone is assigned is generated. In the present embodiment, FIG. 1 of the first embodiment is replaced with FIG. 34, and FIG. 6 of the first embodiment is replaced with FIG. 35. Note that, the same device and processing are denoted by the same reference sign, and description thereof is omitted.

9.1 Overall Configuration

Figure 34:
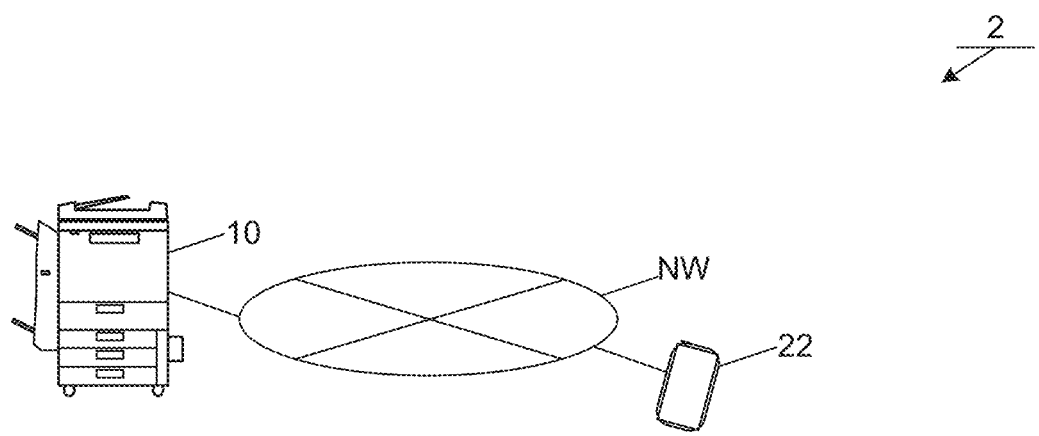
FIG. 34 is a diagram illustrating an overall configuration of a system according to a ninth embodiment.

FIG. 34 is a diagram illustrating an overall configuration of a system 2 according to the present embodiment. In the present embodiment, in the system 2, a mobile phone 22 as an external apparatus is connected to a network NW. Note that, since a functional configuration of the mobile phone 22 is similar to that of the information processing apparatus 20 illustrated in FIG. 4, description thereof is omitted.

9.2 Flow of Processing

9.2.1 Mobile Phone

In the mobile phone 22 according to the present embodiment, a print data transmitter 202 is achieved by installing in advance a print data transmission application 262 (printing application). The print data transmitter 202 transmits print data to a multifunction peripheral 10 in response to a user operation. In a case where the print data transmitter 202 transmits print data to the multifunction peripheral 10, the print data transmitter 202 acquires information such as a telephone number, and a user name registered by the user, and transmits the information to the multifunction peripheral 10 together with information indicating that the print data is transmitted from the mobile phone.

9.2.2 Print Data Storage Processing

Figure 35:
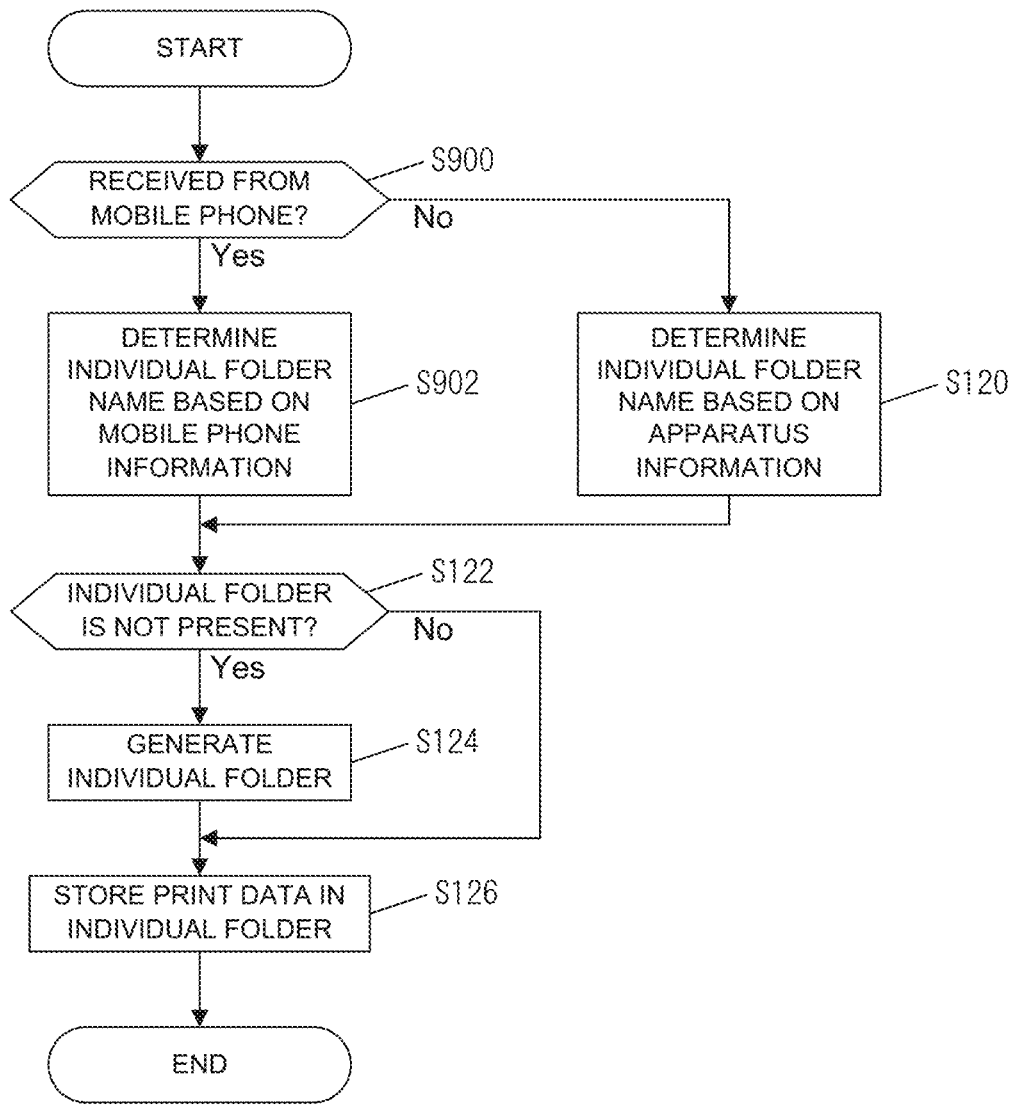
FIG. 35 is a flowchart of print data storage processing according to the ninth embodiment.

A flow of individual folder display processing according to the present embodiment is described with reference to FIG. 35. In the present embodiment, a controller 100 determines whether print data have been received from the mobile phone 22 (step S900). In a case where print data have been received from the mobile phone 22, the controller 100 acquires information on the mobile phone 22, and determines the name, based on the information on the mobile phone 22 (step S900; Yes→step S902). In this case, in step S124, the controller 100 can generate an individual folder having a name based on the information on the mobile phone 22. In addition, in step S126, the controller 100 can store print data in the individual folder to which the name based on the information on the mobile phone 22 is assigned. On the other hand, in a case where the controller 100 has not received print data from the mobile phone 22, the controller 100 acquires information on an apparatus that has transmitted the print data, and determines the name based on the information on the apparatus (step S900; No→step S120).

9.3 Operation Example

Figure 36A:
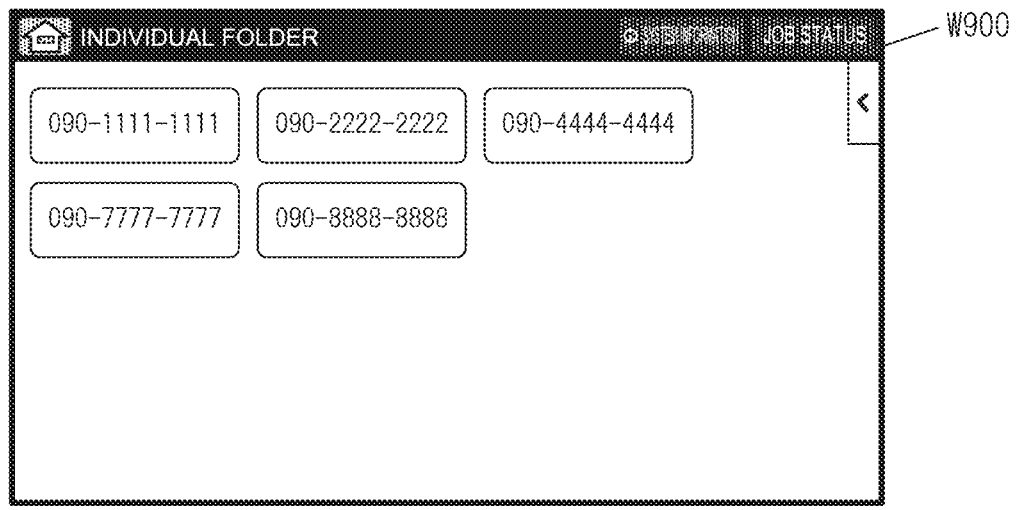
FIGS. 36A and 36B are diagrams illustrating an operation example according to the ninth embodiment.
Figure 36B:
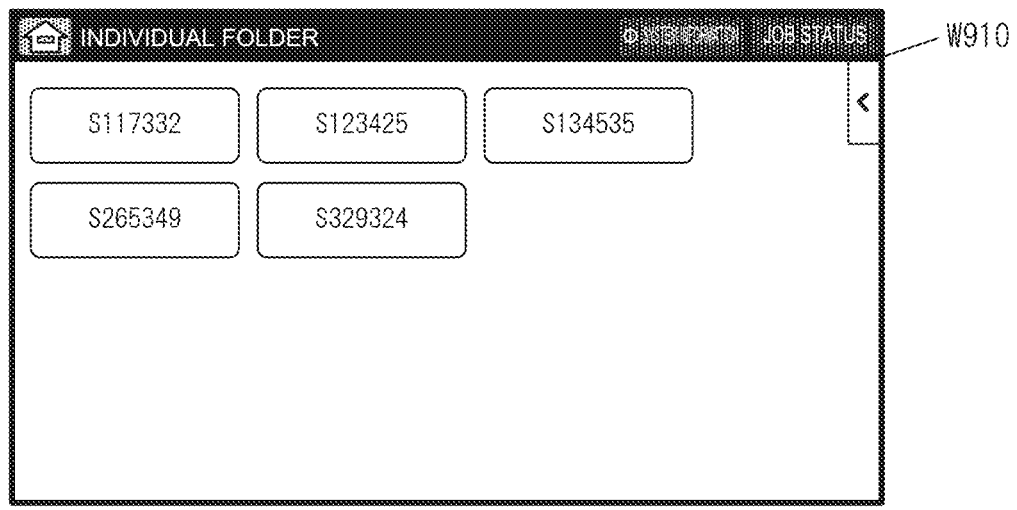

Diagrams illustrated in FIGS. 36A and 36B are diagrams illustrating screen examples of a screen to be displayed on a display 140. FIG. 36A is a diagram illustrating a screen example of an individual folder list screen W900 to be displayed in a case where the name of an individual folder is assigned based on the telephone number of the mobile phone 22 that has transmitted print data. For example, the user can confirm a content of an individual folder that stores print data transmitted from the mobile phone 22 by selecting, on the individual folder list screen W900, an individual folder to which the number of the mobile phone 22 owned by the user is assigned.

Further, FIG. 36B is a diagram illustrating a screen example of an individual folder list screen W910 to be displayed in a case where the name of an individual folder is assigned based on the user name of the mobile phone 22 that has transmitted print data. As illustrated in FIG. 36B, in a case where print data have been transmitted from the mobile phone 22, an individual folder to which a user name is assigned may be generated.

Note that, the above description has been made for a case where a telephone number or a user name is used as information on the mobile phone 22. However, information other than the telephone number and the user name may be used. For example, an International Mobile Equipment Identity (IMEI) of the mobile phone 22 may be used, or authentication information (e.g., a user name of another service) on the another service to which the mobile phone 22 is connected may be used.

As described above, the multifunction peripheral according to the present embodiment is enabled to receive print data from a terminal apparatus such as a smartphone, and store the print data in an individual folder. At this occasion, the multifunction peripheral according to the present embodiment generates an individual folder to which a name based on information on a mobile phone is assigned. Thus, the user can easily select an individual folder that stores print data, based on information on a mobile phone owned by the user.

10. Modifications

The present disclosure is not limited to the above-described embodiments, and various modifications are available. In other words, embodiments acquired by combining modified technical means appropriately within the range that does not depart from the gist of the present disclosure are also included in the technical scope of the present disclosure.

In addition, the above-described embodiments have parts that are described separately for convenience of description.

However, it is needless to say that the embodiments may be combined and implemented within the technically possible range.

In addition, a program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

In addition, each functional block, or various features of a device used in the above-described embodiments may be implemented or performed with electrical circuitry, e.g., an integrated circuit or a plurality of integrated circuits. The electrical circuitry designed to implement the functions described in the present specification may include a general purpose processor, a digital signal processor (DSP), an application-specific integrated circuit (ASIC), a field programmable gate array (FPGA), or other programmable logic device, a discrete gate, or a transistor logic, a discrete hardware component, or any combination thereof. The general purpose processor may be a microprocessor, a conventional processor, a controller, a microcontroller, or a state machine. The above-described electrical circuitry may be constituted of a digital circuit, or may be constituted of an analog circuit. In addition, in a case where an integrated circuit technology that replaces a current integrated circuit appears due to progress of a semiconductor technology, one or more aspects of the present disclosure can use a new integrated circuit according to the technology.

What is claimed is:

1. An image forming apparatus comprising:
    a controller;
    a storage that is capable of storing data; and
    an image former that forms an image based on the data, wherein
    the storage has an individual folder, and
    the controller
        stores, if the data has been received from an external apparatus, the data in the individual folder to which a name based on information on the external apparatus is assigned,
        enables settings for the individual folder,
        displays, on a screen that displays the individual folder, the individual folder that is set to satisfy a display condition, regardless of whether the data is stored in the individual folder, and
        hides the individual folder from the screen in a case that the individual folder is an individual folder that does not satisfy a display condition and does not store the data.

2. The image forming apparatus according to claim 1, wherein
    the display condition is that a setting is performed to fixedly display the individual folder.

3. The image forming apparatus according to claim 2, wherein
    the controller further fixedly displays the individual folder in a case that an operation of changing the name of the individual folder is performed.

4. The image forming apparatus according to claim 2, wherein
    the storage further stores, for each user, a user folder for which the data is managed by the user, and
    the controller further allows the individual folder to be movable to the user folder associated with the user when the individual folder is set to be fixedly displayed by the user.

5. The image forming apparatus according to claim 1, wherein
    the display condition is that a password is set for the individual folder.

6. The image forming apparatus according to claim 1, wherein
    the controller further displays the screen including a first area where the individual folder that is set to satisfy the display condition is displayed, and a second area where the individual folder that is not set to satisfy the display condition is displayed.

7. The image forming apparatus according to claim 1, wherein
    the controller further groups and displays individual folders, including the individual folder, in which a part of the name is common.

8. The image forming apparatus according to claim 1, wherein
    in a case that the data stored in the individual folder is displayed, the controller displays unprinted data in a mode different from a mode of printed data.

9. The image forming apparatus according to claim 1, wherein
    the controller further
        authenticates a user, and
        displays, on the screen, only the individual folder displayable to the authenticated user.

10. The image forming apparatus according to claim 1, wherein
    the external apparatus is a mobile phone, and
    the controller further receives the data from the mobile phone, and generates the individual folder to which the name, based on information on the mobile phone, is assigned.

11. A folder display control method comprising:
    storing, if data has been received from an external apparatus, the data in an individual folder to which a name based on information on the external apparatus is assigned;
    enabling settings for the individual folder;

displaying, on a screen that displays the individual folder, the individual folder that is set to satisfy a display condition, regardless of whether the data is stored in the individual folder; and hiding the individual folder from the screen in a case that the individual folder is an individual folder that does not satisfy a display condition and does not store the data.

* * * * *